(12) United States Patent
Baxter

(10) Patent No.: US 6,182,206 B1
(45) Date of Patent: Jan. 30, 2001

(54) DYNAMICALLY RECONFIGURABLE COMPUTING USING A PROCESSING UNIT HAVING CHANGEABLE INTERNAL HARDWARE ORGANIZATION

(75) Inventor: Michael A. Baxter, Sunnyvale, CA (US)

(73) Assignee: Ricoh Corporation (JP)

(*) Notice: Under 35 U.S.C. 154(b), the term of this patent shall be extended for 0 days.

(21) Appl. No.: 09/031,323

(22) Filed: Feb. 26, 1998

Related U.S. Application Data

(62) Division of application No. 08/423,560, filed on Apr. 17, 1995, now Pat. No. 5,794,062.

(51) Int. Cl.[7] .................................................. G06F 15/00
(52) U.S. Cl. ........................... 712/43; 712/227; 712/229
(58) Field of Search ........................... 712/34, 227, 310, 712/229, 37, 43; 703/20, 21

(56) References Cited

U.S. PATENT DOCUMENTS

| | | | |
|---|---|---|---|
| 5,109,353 | 4/1992 | Sample et al. | 364/578 |
| 5,361,373 | * 11/1994 | Gilson | 712/1 |
| 5,574,930 | * 11/1996 | Halverson, Jr. et al. | 712/34 |
| 5,600,845 | * 2/1997 | Gilson | 712/39 |
| 5,684,980 | * 11/1997 | Casselman | 395/500 |
| 5,737,631 | * 4/1998 | Trimberger | 712/37 |
| 5,742,180 | * 4/1998 | DeHon et al. | 326/40 |
| 5,752,035 | * 5/1998 | Trimberger | 395/705 |
| 5,944,813 | * 8/1999 | Trimberger | 712/36 |
| 6,023,755 | * 2/2000 | Casselman | 712/37 |

\* cited by examiner

*Primary Examiner*—Larry D. Donaghue
(74) *Attorney, Agent, or Firm*—Fenwick & West LLP

(57) ABSTRACT

A set of S-machines, a T-machine corresponding to each S-machine, a General Purpose Interconnect Matrix (GPIM), a set of I/O T-machines, a set of I/O devices, and a master time-base unit form a system for scalable, parallel, dynamically reconfigurable computing. Each S-machine is a dynamically reconfigurable computer having a memory, a first local time-base unit, and a Dynamically Reconfigurable Processing Unit (DRPU). The DRPU is implemented using a reprogrammable logic device configured as an Instruction Fetch Unit (IFU), a Data Operate Unit (DOU), and an Address Operate Unit (AOU), each of which are selectively reconfigured during program execution in response to a reconfiguration interrupt or the selection of a reconfiguration directive embedded within a set of program instructions. Each reconfiguration interrupt and each reconfiguration directive references a configuration data set specifying a DRPU hardware organization optimized for the implementation of a particular Instruction Set Architecture (ISA). The IFU directs reconfiguration operations, instruction fetch and decode operations, memory access operations, and issues control signals to the DOU and the AOU to facilitate instruction execution. The DOU performs data computations, and the AOU performs address computations. Each T-machine is a data transfer device having a common interface and control unit, one or more interconnect I/O units, and a second local time-base unit. The GPIM is a scalable interconnect network that facilitates parallel communication between T-machines. The set of T-machines and the GPIM facilitate parallel communication between S-machines.

26 Claims, 23 Drawing Sheets

DYNAMICALLY RECONFIGURABLE COMPUTING USING A PROCESSING UNIT HAVING CHANGEABLE INTERNAL HARDWARE ORGANIZATION

CROSS-REFERENCE TO RELATED APPLICATION

This application is a divisional of U.S. patent application Ser. No. 08/423,560 for "System and Method for Dynamically Reconfigurable Computing Using a Processing Unit," filed on Apr. 17, 1995 U.S. Pat. No. 5,794,062. The disclosure of the parent application is incorporated herein by reference.

The present invention relates to U.S. patent application Ser. No. 08/501,970, entitled "System and Method for Phase-Synchronous, Flexible Frequency Clocking and Messaging," filed on Jul. 21, 1995, which is incorporated herein by reference.

BACKGROUND OF THE INVENTION

1. Field of the Invention

The present invention relates generally to computer architecture, and more particularly to systems and methods for reconfigurable computing. Still more particularly, the present invention is a system and method for scalable, parallel, dynamically reconfigurable computing.

2. Description of the Background Art

The evolution of computer architecture is driven by the need for ever-greater computational performance. Rapid, accurate solution of different types of computational problems typically requires different types of computational resources. For a given range of problem types, computational performance can be enhanced through the use of computational resources that have been specifically architected for the problem types under consideration. For example, the use of Digital Signal Processing (DSP) hardware in conjunction with a general-purpose computer can significantly enhance certain types of signal processing performance. In the event that a computer itself has been specifically architected for the problem types under consideration, computational performance will be further enhanced, or possibly even optimized relative to the available computational resources, for these particular problem types. Current parallel and massively-parallel computers, offering high performance for specific types of problems of $O(n^2)$ or greater complexity, provide examples in this case.

The need for greater computational performance must be balanced against the need to minimize system cost and the need to maximize system productivity in a widest-possible range of both current-day and possible future applications. In general, the incorporation of computational resources dedicated to a limited number of problem types into a computer system adversely affects system cost because specialized hardware is typically more expensive than general-purpose hardware. The design and production of an entire special-purpose computer can be prohibitively expensive in terms of both engineering time and hardware costs. The use of dedicated hardware to increase computational performance may offer few performance benefits as computational needs change. In the prior art, as computational needs have changed, new types of specialized hardware or new special-purpose systems have been designed and manufactured, resulting in an ongoing cycle of undesirably large nonrecurrent engineering costs. The use of computational resources dedicated to particular problem types therefore results in an inefficient use of available system Silicon when considering changing computational needs. Thus, for the reasons described above, attempting to increase computational performance using dedicated hardware is undesirable.

In the prior art, various attempts have been made to both increase computational performance and maximize problem type applicability using reprogrammable or reconfigurable hardware. A first such prior art approach is that of downloadable microcode computer architectures. In a downloadable microcode architecture, the behavior of fixed, nonreconfigurable hardware resources can be selectively altered by using a particular version of microcode. An example of such an architecture is that of the IBM System/360. Because the fundamental computational hardware in such prior art systems is not itself reconfigurable, such systems do not provide optimized computational performance when considering a wide range of problem types.

A second prior art approach toward both increasing computational performance and maximizing problem type applicability is the use of reconfigurable hardware coupled to a nonreconfigurable host processor or host system. This prior art approach most commonly involves the use of one or more reconfigurable co-processors coupled to a nonreconfigurable host. This approach can be categorized as an "Attached Reconfigurable Processor" (ARP) architecture, where some portion of hardware within a processor set attached to a host is reconfigurable. Examples of present-day ARP systems that utilize a set of reconfigurable processors coupled to a host system include: the SPLASH-1 and SPLASH-2 systems, designed at the Supercomputing Research Center (Bowie, Md.); the WILDFIRE Custom Configurable Computer produced by Annapolis Micro Systems (Annapolis, Md.), which is a commercial version of the SPLASH-2; and the EVC-1, produced by the Virtual Computer Corporation (Reseda, Calif.), In most computation-intensive problems, significant amounts of time are spent executing relatively small portions of program code. In general, ARP architectures are used to provide a reconfigurable computational accelerator for such portions of program code. Unfortunately, a computational model based upon one or more reconfigurable computational accelerators suffers from significant drawbacks, as will be described in detail below.

A first drawback of ARP architectures arises because ARP systems attempt to provide an optimized implementation of a particular algorithm in reconfigurable hardware at a particular time. The philosophy behind Virtual Computer Corporation's EVC-1, for example, is the conversion of a specific algorithm into a specific configuration of reconfigurable hardware resources to provide optimized computational performance for that particular algorithm. Reconfigurable hardware resources are used for the sole purpose of providing optimum performance for a specific algorithm. The use of reconfigurable hardware resources for more general purposes, such as managing instruction execution, is avoided. Thus, for a given algorithm, reconfigurable hardware resources are considered from the perspective of individual gates coupled to ensure optimum performance.

Certain ARP systems rely upon a programming model in which a "program" includes both conventional program instructions as well as special-purpose instructions that specify how various reconfigurable hardware resources are interconnected. Because ARP systems consider reconfigurable hardware resources in a gate-level algorithm-specific manner, these special-purpose instructions must provide explicit detail as to the nature of each reconfigurable hardware resource used and the manner in which it is coupled to other reconfigurable hardware resources. This adversely affects program complexity. To reduce program complexity, attempts have been made to utilize a programming model in which a program includes both conventional high-level programming language instructions as well as high-level special-purpose instructions. Current ARP systems therefore attempt to utilize a compiling system capable of compiling both high-level programming language instructions and the aforementioned high-level special-purpose instructions. The target output of such a compiling system is assembly-language code for the conventional high-level programming language instructions, and Hardware Description Language (HDL) code for the special-purpose instructions. Unfortunately, the automatic determination of a set of reconfigurable hardware resources and an interconnection scheme to provide optimal computational performance for any particular algorithm under consideration is an NP-hard problem. A long-term goal of some ARP systems is the development of a compiling system that can compile an algorithm directly into an optimized interconnection scheme for a set of gates. The development of such a compiling system, however, is an exceedingly difficult task, particularly when considering multiple types of algorithms.

A second shortcoming of ARP architectures arises because an ARP apparatus distributes the computational work associated with the algorithm for which it is configured across multiple reconfigurable logic devices. For example, for an ARP apparatus implemented using a set of Field Programmable Logic Devices (FPGAs) and configured to implement a parallel multiplication accelerator, the computational work associated with parallel multiplication is distributed across the entire set of FPGAs. Therefore, the size of the algorithm for which the ARP apparatus can be configured is limited by the number of reconfigurable logic devices present. The maximum data-set size that the ARP apparatus can handle is similarly limited. An examination of source code does not necessarily provide a clear indication of the limitations of the ARP apparatus because some algorithms may have data dependencies. In general, data-dependent algorithms are avoided.

Furthermore, because ARP architectures teach the distribution of computational work across multiple reconfigurable logic devices, accommodation of a new (or even slightly modified) algorithm requires that reconfiguration be done en masse, that is, multiple reconfigurable logic devices must be reconfigured. This limits the maximum rate at which reconfiguration can occur for alternative problems or cascaded subproblems.

A third drawback of ARP architectures arises from the fact that one or more portions of program code are executed on the host. That is, an ARP apparatus is not an independent computing system in itself, the ARP apparatus does not execute entire programs, and therefore interaction with the host is required. Because some program code is executed upon the nonreconfigurable host, the set of available Silicon resources is not maximally utilized over the time-frame of the program's execution. In particular, during host-based instruction execution, Silicon resources upon the ARP apparatus will be idle or inefficiently utilized. Similarly, when the ARP apparatus operates upon data, Silicon resources upon the host will, in general, be inefficiently utilized. In order to readily execute multiple entire programs, Silicon resources within a system must be grouped into readily reusable resources. As previously described, ARP systems treat reconfigurable hardware resources as a set of gates optimally interconnected for the implementation of a particular algorithm at a particular time. Thus, ARP systems do not provide a means for treating a particular set of reconfigurable hardware resources as a readily reusable resource from one algorithm to another because reusability requires a certain level of algorithmic independence.

An ARP apparatus cannot treat its currently-executing host program as data, and in general cannot contextualize itself. An ARP apparatus could not readily be made to simulate itself through the execution of its own host programs. Furthermore, an ARP apparatus could not be made to compile its own HDL or application programs upon itself, directly using the reconfigurable hardware resources from which it is constructed. An ARP apparatus is thus architecturally limited in relation to self-contained computing models that teach independence from a host processor.

Because an ARP apparatus functions as a computational accelerator, it in general is not capable of independent Input/Output (I/O) processing. Typically, an ARP apparatus requires host interaction for I/O processing. The performance of an ARP apparatus may therefore be I/O limited. Those skilled in the art will recognize that an ARP apparatus can, however, be configured for accelerating a specific I/O problem. However, because the entire ARP apparatus is configured for a single, specific problem, an ARP apparatus cannot balance I/O processing with data processing without compromising one or the other. Moreover, an ARP apparatus provides no means for interrupt processing. ARP teachings offer no such mechanism because they are directed toward maximizing computational acceleration, and interruption negatively impacts computational acceleration.

A fourth drawback of ARP architectures exists because there are software applications that possess inherent data parallelism that is difficult to exploit using an ARP apparatus. HDL compilation applications provide one such example when net-name symbol resolution in a very large netlist is required.

A fifth drawback associated with ARP architectures is that they are essentially a SIMD computer architecture model. ARP architectures are therefore less effective architecturally than one or more innovative prior art nonreconfigurable systems. ARP systems mirror only a portion of the process of executing a program, chiefly, the arithmetic logic for arithmetic computation, for each specific configuration instance, for as much computational power as the available reconfigurable hardware can provide. In contradistinction, in the system design of the SYMBOL machine at Fairchild in 1971, the entire computer used a unique hardware context for every aspect of program execution. As a result, SYMBOL encompassed every element for the system application of a computer, including the host portion taught by ARP systems.

ARP architectures exhibit other shortcomings as well. For example, an ARP apparatus lacks an effective means for providing independent timing to multiple reconfigurable logic devices. Similarly, cascaded ARP apparatus lack an effective clock distribution means for providing independently-timed units. As another example, it is difficult to accurately correlate execution time with the source code statements for which acceleration is attempted. For an accurate estimate of net system clock rate, the ARP device must be modeled with a Computer-Aided Design (CAD) tool after HDL compilation, a time-consuming process for arriving at such a basic parameter.

What is needed is a means for reconfigurable computing that overcomes the limitations of the prior art described above.

SUMMARY OF THE INVENTION

The present invention is a system and method for scalable, parallel, dynamically reconfigurable computing. The system comprises at least one S-machine, a T-machine corresponding to each S-machine, a General-Purpose Interconnect Matrix (GPIM), a set of I/O T-machines, one or more I/O devices, and a master time-base unit. In the preferred embodiment, the system includes multiple S-machines. Each S-machine has an input and an output coupled to an output and an input of a corresponding T-machine, respectively. Each T-machine includes a routing input and a routing output coupled to the GPIM, as does each I/O T-machine. An I/O T-machine further includes an input and an output coupled to an I/O device. Finally, each S-machine, T-machine, and I/O T-machine has a master timing input coupled to a timing output of the master time-base unit.

The master time-base unit provides a system-wide frequency reference to each S-machine, T-machine, and I/O T-machine. Each S-machine is a computer having a processing unit that can be selectively reconfigured during the execution of program instructions. Each T-machine is a data transfer device. The GPIM provides a scalable point-to-point parallel interconnect means for communication between T-machines. Taken together, the set of T-machines and the GPIM provide a scalable point-to-point parallel interconnect means for communication between S-machines.

An S-machine preferably comprises a first local time-base unit, a memory, and a Dynamically Reconfigurable Processing Unit (DRPU). The first local time-base unit has a timing input coupled to the master time-base unit, and a timing output coupled to a timing input of the DRPU and a timing input of the memory via a first timing signal line. The DRPU has a control signal output, and address output, and a bidirectional data port coupled to a control signal input, an address input, and a bidirectional data port of the memory, respectively, via a memory control line, an address line, and a memory I/O line, respectively. The DRPU also has a bidirectional control port coupled to a bidirectional control port of its corresponding T-machine via an external control line.

The first local time-base unit receives a master timing signal from the master time-base unit, and generates a first local timing signal that is delivered to the DRPU and the memory via a first timing signal line. The memory is preferably a Random Access Memory (RAM) storing program instructions, program data, and one or more configuration data sets. In the preferred embodiment, a given S-machine's memory is accessible to any other S-machine in the system via the GPIM and its corresponding T-machine.

A group of program instructions dedicated to performing a specific set of operations upon potentially large data sets is referred to herein as an "inner-loop" portion of a program. A group of program instructions responsible for performing general-purpose operations and/or transferring control from one inner-loop portion to another is referred to herein as an "outer-loop" portion of the program. Within any given program, each inner-loop portion preferably consists of a small number of instruction types, while outer-loop portions preferably include a variety of general-purpose instruction types.

Each configuration data set stored in the memory specifies a DRPU hardware organization optimized for the implementation of a corresponding Instruction Set Architecture (ISA). An ISA is a primitive set of instructions that can be used to program a computer. In the present invention, an ISA can be categorized as an inner-loop ISA or an outer-loop ISA according to the number and types of instructions it contains. An inner-loop ISA consists of relatively few instructions, where the instructions are useful for performing specific types of operations. An outer-loop ISA includes several instructions, where the instructions are useful for performing a variety of general-purpose operations.

Program instructions stored in the memory selectively include one or more reconfiguration directives, where each reconfiguration directive references a configuration data set. During program execution by the DRPU, one or more reconfiguration directives may be selected. The selection of a given reconfiguration directive results in a reconfiguration of DRPU hardware according to the configuration data set referenced by the reconfiguration directive. Thus, upon selection of a reconfiguration directive, the DRPU hardware is reconfigured to provide an optimized implementation of a particular ISA. In the present invention, reconfiguration of the DRPU is also initiated in response to a reconfiguration interrupt, where the reconfiguration interrupt references a configuration data set corresponding to an ISA in the manner described above.

The DRPU comprises an Instruction Fetch Unit (IFU), a Data Operate Unit (DOU), and an Address Operate Unit (AOU), each of which are dynamically reconfigurable. In the preferred embodiment, the DRPU is implemented using a reconfigurable logic device such as a Xilinx XC4013 Field Programmable Gate Array (FPGA). The reprogrammable logic device preferably provides a plurality of selectively reprogrammable 1) logic blocks, or Configurable Logic Blocks (CLBs); 2) I/O Blocks (IOBs); 3) interconnect structures; 4) data storage resources; 5) tri-state buffer resources; and 6) wired-logic capabilities.

The IFU has a memory control output that forms the DRPU's memory control output, a data input coupled to the memory I/O line, and a bidirectional control port that forms the DRPU's bidirectional control port. The IFU additionally has a first, second, and third control output. The DOU and the AOU each have a bidirectional data port coupled to the memory I/O line, and the AOU has an address output coupled to the address line. The DOU has a first control input coupled to the IFU's first control output via a first control line. The AOU has a first control input coupled to the IFU's second control output via a second control line. Both the DOU and the AOU have a second control input coupled to the IFU's third control output via a third control line. Finally, each of the IFU, the DOU, and the AOU has a timing input coupled to the first timing signal line.

The IFU directs instruction fetch and decode operations, memory access operations, DRPU reconfiguration operations, and issues control signals to the DOU and the AOU to facilitate instruction execution. The IFU preferably comprises an architecture description memory, an Instruction State Sequencer (ISS), memory access logic, reconfiguration logic, interrupt logic, a fetch control unit, an instruction buffer, an decode control unit, an instruction decoder, an opcode storage register set, a Register File (RF) address register set, a constants register set, and a process control register set. The ISS has a first and a second control output that form the IFU's first and second control outputs, respectively; a timing input that forms the IFU's timing input; a fetch/decode control output coupled to a control input of the fetch control unit and a control input of the decode control input; a bidirectional control port coupled to a first bidirectional control port of each of the memory access logic, the reconfiguration logic, and the interrupt logic; an opcode input coupled to an output of the opcode storage register set;

and a bidirectional data port coupled to a bidirectional data port of the process control register set. Each of the memory access logic, the reconfiguration logic, and the interrupt logic have a second bidirectional control port coupled to the external control line; and a data input coupled to a data output of the architecture description memory. The memory access logic also has a control output that forms the IFU's memory control output, and the interrupt logic additionally has an output coupled to the bidirectional data port of the process control register set.

The architecture description memory preferably comprises a memory for storing architecture specification signals that characterize the DRPU configuration at any given time. The architecture specification signals preferably include a reference to a default configuration data set; a reference to a list of allowable configuration data sets; an atomic memory address increment; and a set of interrupt response signals that specify how the current DRPU hardware configuration responds to interrupts. The ISS preferably comprises a state machine that facilitates the execution of instructions within the currently-considered ISA by issuing signals to the fetch control unit, the decode control unit, the DOU, the AOU, and the memory access logic. The ISS issues DOU control signals on the first control line, AOU control signals on the second control line, and RF addresses and constants on the third control line. The interrupt logic preferably comprises a state machine that performs interrupt notification operations. The reconfiguration logic preferably comprises a state machine that performs reconfiguration operations in response to a reconfiguration signal. In the preferred embodiment, the reconfiguration signal is generated in response to a reconfiguration interrupt, or when a reconfiguration directive is selected during program execution.

The DOU performs operations related to data computation in accordance with DOU control signals, RF addresses, and constants received from the IFU. The DOU preferably comprises a DOU cross-bar switch, store/align logic, and data operate logic. The DOU cross-bar switch has a bidirectional data port that forms the DOU's bidirectional data port; a constants input coupled to the IFU's third control line; a first data feedback input coupled to a data output of the data operate logic; a second data feedback input coupled to a data output of the store/align logic; and a data output coupled to a data input of the store/align logic. The store/align logic includes an address input coupled to the third control line, and the data operate logic includes a data input coupled to the output of the store/align logic. Finally, each of the DOU cross-bar switch, the store/align logic, and the data operate logic has a control input coupled to the first control line.

The DOU cross-bar switch loads data from the memory, transfers results output by the data operate logic to the store/align logic or the memory, and loads constants output by the IFU in response to the DOU control signals received at its control input. The store/align logic provides temporary storage for operands, constants, and partial results associated with data computations. The data operate logic performs arithmetic, shifting, and/or logical operations in response to the DOU control signals received at its control input.

The AOU performs operations related to address computation, and preferably comprises a AOU cross-bar switch, store/count logic, address operate logic, and an address multiplexor. The AOU cross-bar switch has a bidirectional data port that forms the AOU's bidirectional data port; an address feedback input coupled to an address output of the address operate logic; a constants input coupled to the third control line; and an address output coupled to an address input of the store/count logic. The store/count logic includes an RF address input coupled to the third control line, and an address output coupled to an address input of the address operate logic. The address multiplexor has a first input coupled to the address output of the store/count logic, and a second input coupled to the address output of the address operate logic. Each of the AOU cross-bar switch, the store/count logic, and the address operate logic also has a control input coupled to the second control line.

The AOU cross-bar switch loads addresses from the memory, transfers results output by the address operate logic to the store/count logic or the memory, and loads constants output by the IFU into the store/count logic in response to the AOU control signals received at its control input. The store/count logic provides temporary storage of addresses and address computation results. The address operate logic performs arithmetic operations upon addresses in accordance with the AOU control signals received at its control input. The address multiplexor selectively outputs an address received from the store/count logic or the address operate logic in accordance with the AOU control signals received at its control input.

Each element within the IFU, the DOU, and the AOU is implemented using reconfigurable hardware resources within the reprogrammable logic device, as specified by a given configuration data set that corresponds to a particular ISA. The detailed internal structure of the elements within IFU, the DOU, and the AOU preferably varies according to the type of ISA for which the DRPU is configured to implement at any given moment. For an outer-loop ISA, the internal structure of each element within the IFU, the DOU, and the AOU is preferably optimized for serial instruction processing. For an inner-loop ISA, the internal structure of each element within the IFU, the DOU, and the AOU is preferably optimized for parallel instruction processing.

Each T-machine preferably comprises a common interface and control unit, a set of interconnect I/O units, and a second local time-base unit. The second local time-base unit has a timing input coupled to the master time-base unit, and a timing output coupled to a timing input of the common interface and control unit. The common interface and control unit has an address output coupled to the address line, a first bidirectional data port coupled to the memory I/O line, a bidirectional control port coupled to the external control line, and a second bidirectional data port coupled to a bidirectional data port of each of its associated interconnect I/O units.

The second local time-base unit generates a second local timing signal derived from the master frequency reference received from the master time-base unit. The common interface and control unit directs the transfer of data and commands between its corresponding S-machine and one of its associated interconnect I/O units. Each interconnect I/O unit transfers messages received from its associated common interface and control unit to another interconnect I/O unit via the GPIM. Each interconnect I/O unit also selectively transfers messages received from other interconnect I/O units to its associated common interface and control unit.

Each I/O T-machine preferably comprises a common custom interface and control unit, an interconnect I/O unit, and a third local time-base unit. The internal couplings within an I/O T-machine are analogous to those within a T-machine; however, an I/O T-machine is coupled to an I/O device rather than to an S-machine, and therefore includes couplings specific to a particular I/O device. Via its corresponding T-machine, the GPIM, and an I/O T-machine, an S-machine communicates with a particular I/O device in the system.

The GPIM provides a scalable point-to-point interconnect means for parallel communication between T-machines. The set of T-machines and the GPIM together form a scalable point-to-point interconnect means for parallel communication between S-machines. The GPIM preferably comprises a k-ary n-cube static interconnect network having a plurality of first communication channels and a plurality of second communication channels. Each first communication channel includes a plurality of node connection sites, as does each second communication channel. Each interconnect I/O unit in the system is coupled to the GPIM such that its input is coupled to a particular node connection site via a message input line, and its output is coupled to another node connection site via message output line. The GPIM is thus a scalable network for routing data and commands between multiple interconnect I/O units in parallel.

DETAILED DESCRIPTION OF THE PREFERRED EMBODIMENTS

Figure 1:
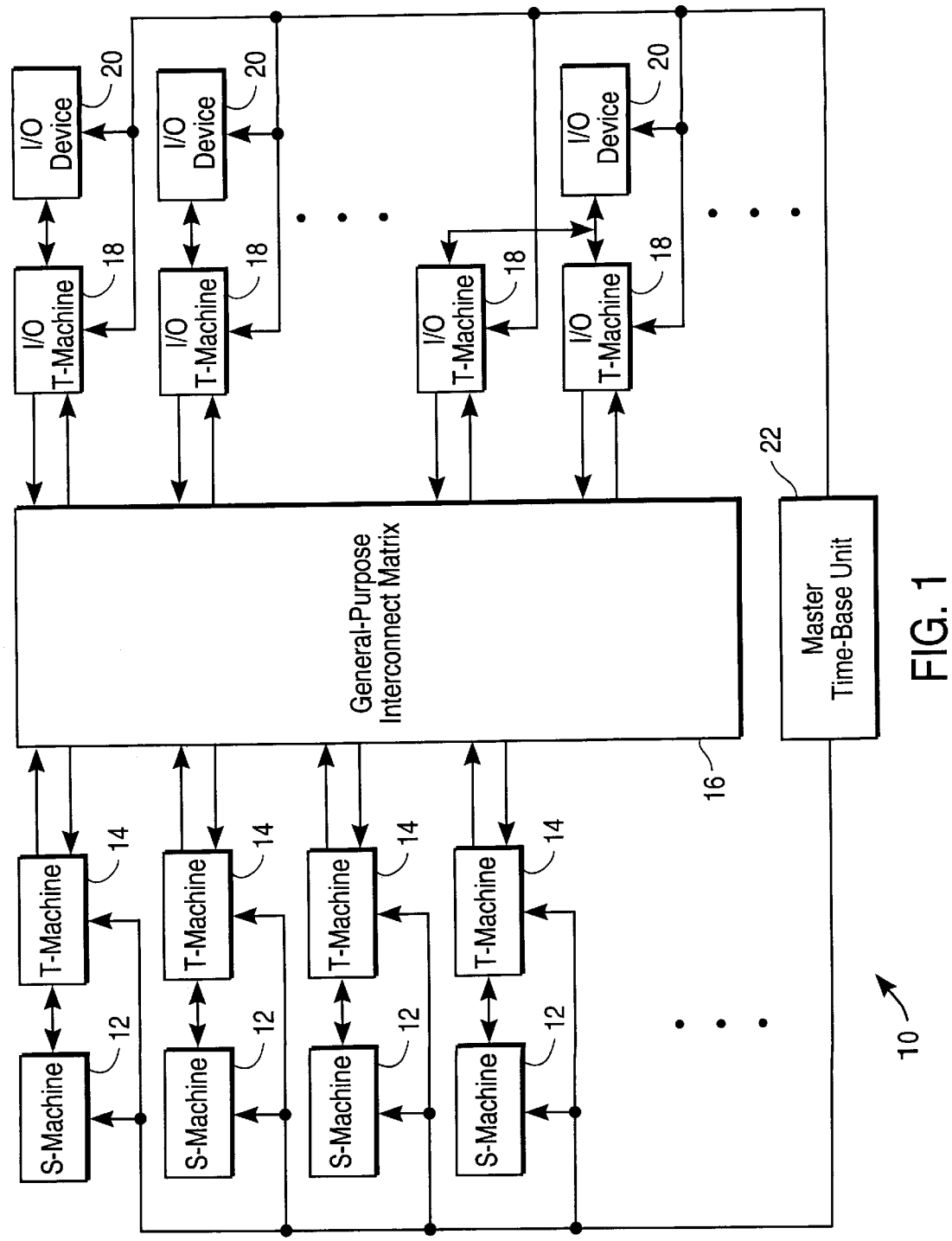
FIG. 1 is a block diagram of a preferred embodiment of a system for scalable, parallel, dynamically reconfigurable computing constructed in accordance with the present invention.

Referring now to FIG. 1, a block diagram of a preferred embodiment of a system 10 for scalable, parallel, dynamically reconfigurable computing constructed in accordance with the present invention is shown. The system 10 preferably comprises at least one S-machine 12, a T-machine 14 corresponding to each S-machine 12, a General Purpose Interconnect Matrix (GPIM) 16, at least one I/O T-machine 18, one or more I/O devices 20, and a master time-base unit 22. In the preferred embodiment, the system 10 comprises multiple S-machines 12, and thus multiple T-machines 14, plus multiple I/O T-machines 18 and multiple I/O devices 20.

Each of the S-machines 12, T-machines 14, and I/O T-machines 18 has a master timing input coupled to a timing output of the master time-base unit 22. Each S-machine 12 has an input and an output coupled to its corresponding T-machine 14. In addition to the input and the output coupled to its corresponding S-machine 12, each T-machine 14 has a routing input and a routing output coupled to the GPIM 16. In a similar manner, each I/O T-machine 18 has an input and an output coupled to an I/O device 20, and a routing input and a routing output to the GPIM 16.

As will be described in detail below, each S-machine 12 is a dynamically-reconfigurable computer. The GPIM 16 forms a point-to-point parallel interconnect means that facilitates communication between T-machines 14. The set of T-machines 14 and the GPIM 16 form a point-to-point parallel interconnect means for data transfer between S-machines 12. Similarly, the GPIM 16, the set of T-machines 14, and the set of I/O T-machines 18 form a point-to-point parallel interconnect means for I/O transfer between S-machines 12 and each I/O device 20. The master time-base unit 22 comprises an oscillator that provides a master timing signal to each S-machine 12 and T-machine 14.

In an exemplary embodiment, each S-machine 12 is implemented using a Xilinx XC4013 (Xilinx, Inc., San Jose, Calif.) Field Programmable Gate Array (FPGA) coupled to 64 Megabytes of Random Access Memory (RAM). Each T-machine 14 is implemented using approximately fifty percent of the reconfigurable hardware resources in a Xilinx XC4013 FPGA, as is each I/O T-machine 18. The GPIM 14 is implemented as a toroidal interconnect mesh. The master time-base unit 22 is a clock oscillator coupled to clock distribution circuitry to provide a system-wide frequency reference, as described in U.S. patent application Ser. No. 08/501,970 entitled "System and Method for Phase-Synchronous, Flexible Frequency Clocking and Messaging." Preferably, the GPIM 14, the T-machines 12, and the I/O T-machines 18 transfer information in accordance with ANSI/IEEE Standard 1596–1992 defining a Scalable Coherent Interface (SCI).

Figure 2:
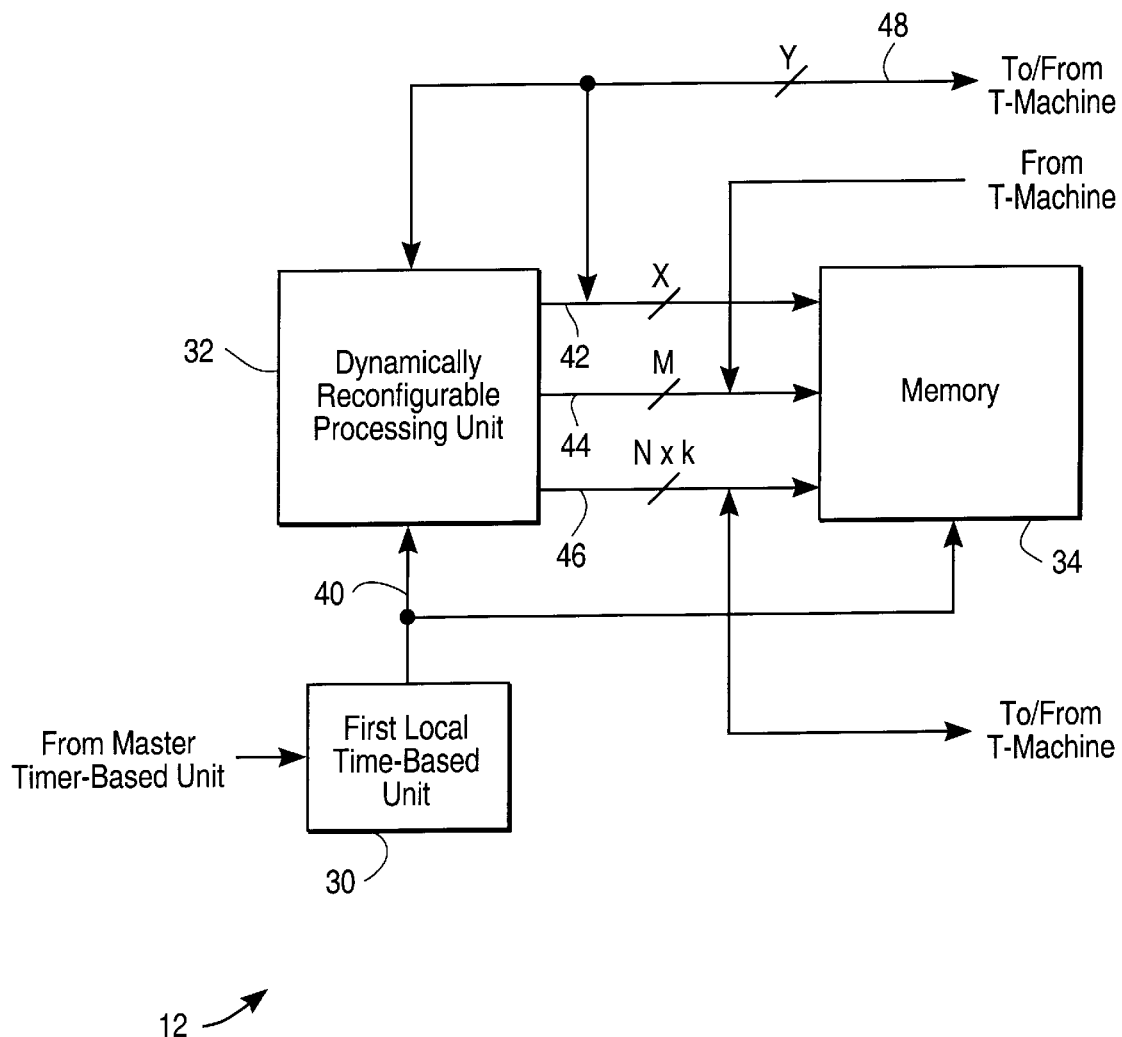
FIG. 2 is a block diagram of a preferred embodiment of an S-machine of the present invention.

In the preferred embodiment, the system 10 comprises multiple S-machines 12 functioning in parallel. The structure and functionality of each individual S-machine 12 are described in detail below with reference to FIGS. 2 through 12B. Referring now to FIG. 2, a block diagram of a preferred embodiment of an S-machine 12 is shown. The S-machine 12 comprises a first local time-base unit 30, a Dynamically Reconfigurable Processing Unit (DRPU) 32 for executing program instructions, and a memory 34. The first local time-base unit 30 has a timing input that forms the S-machine's master timing input. The first local time-base unit 30 also has a timing output that provides a first local timing signal or clock to a timing input of the DRPU 32 and a timing input of the memory 34 via a first timing signal line 40. The DRPU 32 has a control signal output coupled to a control signal input of the memory 34 via a memory control line 42; an address output coupled to an address input of the memory 34 via an address line 44; and a bidirectional data port coupled to a bidirectional data port of the memory 34 via a memory I/O line 46. The DRPU 32 additionally has a bidirectional control port coupled to a bidirectional control port of its corresponding T-machine 14 via an external control line 48. As shown in FIG. 2, the memory control line 42 spans X bits, the address line 44 spans M bits, the memory I/O line 46 spans (N×k) bits, and the external control line 48 spans Y bits.

In the preferred embodiment, the first local time-base unit 30 receives the master timing signal from the master time-base unit 22. The first local time-base unit 30 generates the first local timing signal from the master timing signal, and delivers the first local timing signal to the DRPU 32 and the memory 34. In the preferred embodiment, the first local timing signal can vary from one S-machine 12 to another. Thus, the DRPU 32 and the memory 34 within a given S-machine 12 function at an independent clock rate relative to the DRPU 32 and the memory 34 within any other S-machine 12. Preferably, the first local timing signal is phase-synchronized with the master timing signal. In the preferred embodiment, the first local time-base unit 30 is implemented using phase-locked frequency-conversion circuitry, including phase-lock detection circuitry implemented using reconfigurable hardware resources. Those skilled in the art will recognize that in an alternate embodiment, the first local time-base unit 30 could be implemented as a portion of a clock distribution tree.

Figure 3A:
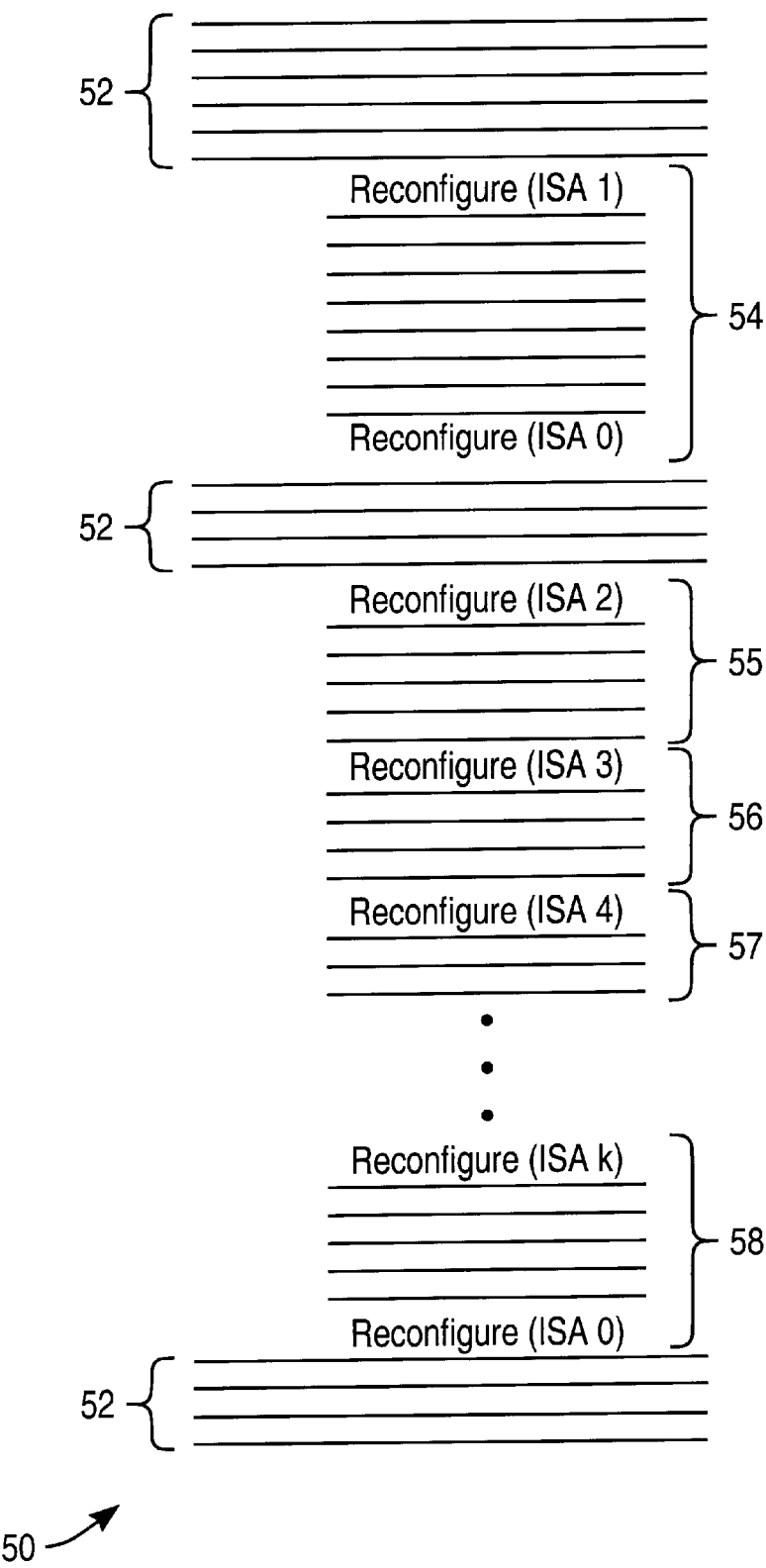
FIG. 3A is an exemplary program listing that includes reconfiguration directives.

The memory 34 is preferably implemented as a RAM, and stores program instructions, program data, and configuration data sets for the DRPU 32. The memory 34 of any given S-machine 12 is preferably accessible to any other S-machine 12 in the system 10 via the GPIM 16. Moreover, each S-machine 12 is preferably characterized as having a uniform memory address space. In the preferred embodiment, program instructions stored in the memory 34 selectively include reconfiguration directives directed toward the DRPU 32. Referring now to FIG. 3A, an exemplary program listing 50 including reconfiguration directives is shown. As shown in FIG. 3A, the exemplary program listing 50 includes a set of outer-loop portions 52, a first inner-loop portion 54, a second inner-loop portion 55, a third inner-loop portion 56, a fourth inner-loop portion 57, and a fifth inner loop portion 58. Those skilled in the art will readily recognize that the term "inner-loop" refers to an iterative portion of a program that is responsible for performing a particular set of related operations, and the term "outer-loop" refers to those portions of a program that are mainly responsible for performing general-purpose operations and/or transferring control from one inner-loop portion to another. In general, inner-loop portions 54, 55, 56, 57, 58 of a program perform specific operations upon potentially large data sets. In an image processing application, for example, the first inner-loop portion 54 might perform color-format conversion operations upon image data, and the second through fifth inner-loop portions 55, 56, 57, 58 might perform linear filtering, convolution, pattern searching, and compression operations. Those skilled in the art will recognize that a contiguous sequence of inner-loop portions 55, 56, 57, 58 can be thought of as a software pipeline. Each outer-loop portion 52 would be responsible for data I/O and/or directing the transfer of data and control from the first inner-loop portion 54 to the second inner-loop portion 55. Those skilled in the art will additionally recognize that a given inner-loop portion 54, 55, 56, 57, 58 may include one or more reconfiguration directives. In general, for any given program, the outer-loop portions 52 of the program listing 50 will include a variety of general-purpose instruction types, while the inner-loop portions 54, 56 of the program listing 50 will consist of relatively few instruction types used to perform a specific set of operations.

In the exemplary program listing 50, a first reconfiguration directive appears at the beginning of the first inner-loop portion 54, and a second reconfiguration directive appears at the end of the first inner-loop portion 54. Similarly, a third reconfiguration directive appears at the beginning of the second inner-loop portion 55; a fourth reconfiguration directive appears at the beginning of the third inner-loop portion 56; a fifth reconfiguration directive appears at the beginning of the fourth inner-loop portion 57; and a sixth and seventh reconfiguration directive appear at the beginning and end of the fifth inner-loop portion 58, respectively. Each reconfiguration directive preferably references a configuration data set that specifies an internal DRPU hardware organization dedicated to and optimized for the implementation of a particular Instruction Set Architecture (ISA). An ISA is a primitive or core set of instructions that can be used to program a computer. An ISA defines instruction formats, opcodes, data formats, addressing modes, execution control flags, and program-accessible registers. Those skilled in the art will recognize that this corresponds to the conventional definition of an ISA. In the present invention, each S-machine's DRPU 32 can be rapidly runtime-configured to directly implement multiple ISAs through the use of a unique configuration data set for each desired ISA. That is, each ISA is implemented with a unique internal DRPU hardware organization as specified by a corresponding configuration data set. Thus, in the present invention, the first through fifth inner-loop portions 54, 55, 56, 57, 58 each correspond to a unique ISA, namely, ISA 1, 2, 3, 4, and k, respectively. Those skilled in the art will recognize that each successive ISA need not be unique. Thus, ISA k could be ISA 1, 2, 3, 4, or any different ISA. The set of outer loop portions 52 also corresponds to a unique ISA, namely, ISA 0. In the preferred embodiment, during program execution the selection of successive reconfiguration directives may be data-dependent. Upon selection of a given reconfiguration directive, program instructions are subsequently executed according to a corresponding ISA via a unique DRPU hardware configuration as specified by a corresponding configuration data set.

In the present invention, a given ISA can be categorized as an inner-loop ISA or an outer-loop ISA according to the number and types of instructions it contains. An ISA that includes several instructions and that is useful for performing general-purpose operations is an outer-loop ISA, while an ISA that consists of relatively few instructions and that is directed to performing specific types of operations is an inner-loop ISA. Because an outer-loop ISA is directed to performing general-purpose operations, an outer-loop ISA is most useful when sequential execution of program instructions is desirable. The execution performance of an outer-loop ISA is preferably characterized in terms of clock cycles per instruction executed. In contrast, because an inner-loop ISA is directected to performing specific types of operations, an inner-loop ISA is most useful when parallel program instruction execution is desirable. The execution performance of an inner-loop ISA is preferably characterized in terms of instructions executed per clock cycle or computational results produced per clock cycle.

Those skilled in the art will recognize that the preceding discussion of sequential program instruction execution and parallel program instruction execution pertains to program instruction execution within a single DRPU 32. The presence of multiple S-machines 12 in the system 10 facilitates the parallel execution of multiple program instruction sequences at any given time, where each program instruction sequence is executed by a given DRPU 32. Each DRPU 32 is configured to have parallel or serial hardware to implement a particular inner-loop ISA or outer-loop ISA, respectively, at a particular time. The internal hardware configuration of any given DRPU 32 changes with time according to the selection of one or more reconfiguration directives embedded within a sequence of program instructions being executed.

In the preferred embodiment, each ISA and its corresponding internal DRPU hardware organization are designed to provide optimum computational performance for a particular class of computational problems relative to a set of available reconfigurable hardware resources. As previously mentioned and as will be described in further detail below, an internal DRPU hardware organization corresponding to an outer-loop ISA is preferably optimized for sequential program instruction execution, and an internal DRPU hardware organization corresponding to an inner-loop ISA is preferably optimized for parallel program instruction execution.

Figure 3B:
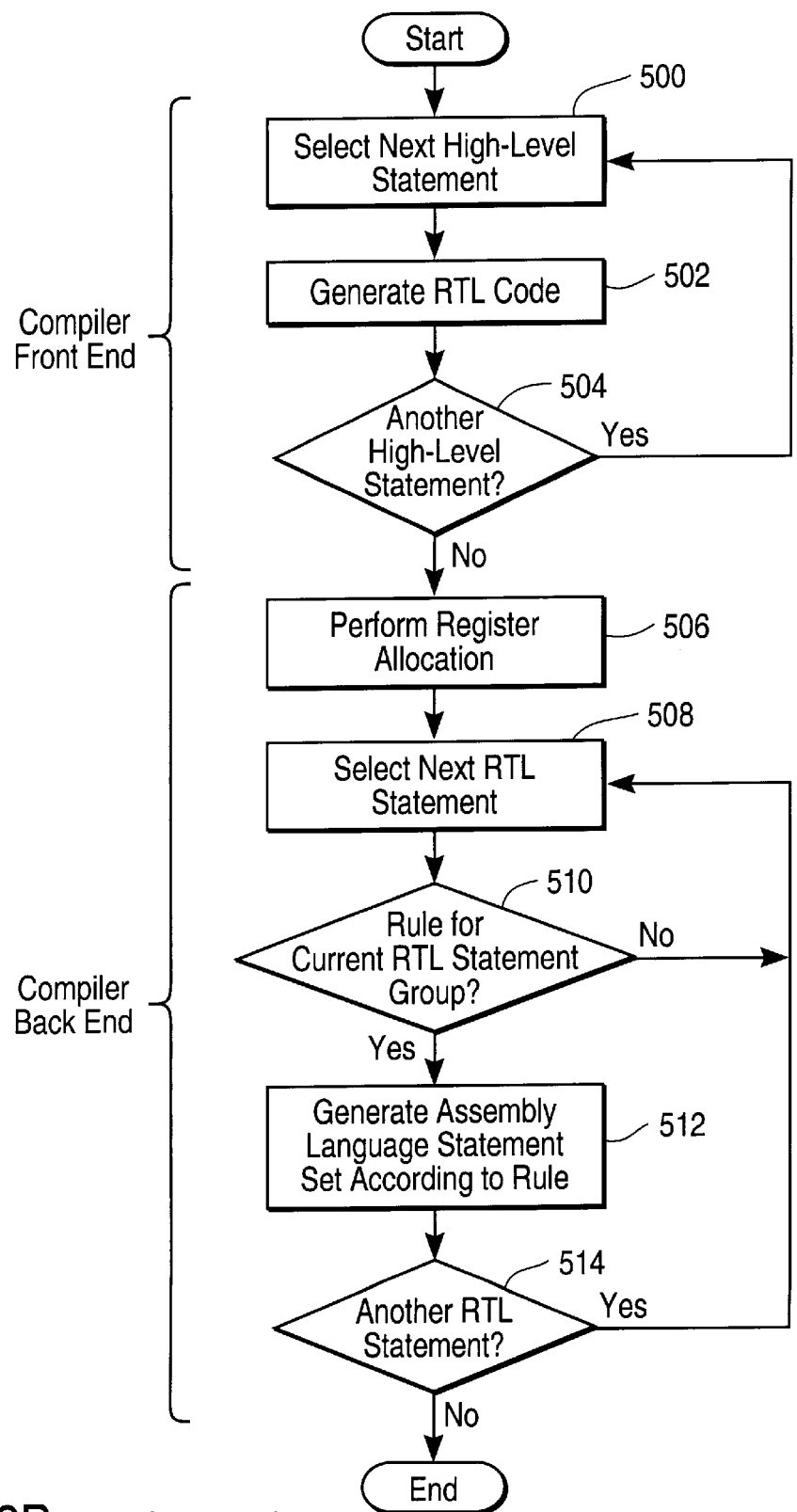
FIG. 3B is a flowchart of prior art compiling operations performed during the compilation of a sequence of program instructions.

With the exception of each reconfiguration directive, the exemplary program listing 50 of FIG. 3A preferably comprises conventional high-level language statements, for example, statements written in accordance with the C programming language. Those skilled in the art will recognize that the inclusion of one or more reconfiguration directives in a sequence of program instructions requires a compiler modified to account for the reconfiguration directives. Referring now to FIG. 3B, a flowchart of prior art compiling operations performed during the compilation of a sequence of program instructions is shown. Herein, the prior art compiling operations correspond in general to those performed by the GNU C Compiler (GCC) produced by the Free Software Foundation (Cambridge, Mass.). Those skilled in the art will recognize that the prior art compiling operations described below can be readily generalized for other compilers. The prior art compiling operations begin in step 500 with the compiler front-end selecting a next high-level statement from a sequence of program instructions.

Next, the compiler front-end generates intermediate-level code corresponding to the selected high-level statement in step 502, which in the case of GCC corresponds to Register Transfer Level (RTL) statements. Following step 502, the compiler front-end determines whether another high-level statement requires consideration in step 504. If so, the preferred method returns to step 500.

If in step 504 the compiler front-end determines that no other high-level statement requires consideration, the compiler back-end next performs conventional register allocation operations in step 506. After step 506, the compiler back-end selects a next RTL statement for consideration within a current RTL statement group in step 508. The compiler back-end then determines whether a rule specifying a manner in which the current RTL statement group can be translated into a set of assembly-language statements exists in step 510. If such a rule does not exist, the preferred method returns to step 508 to select another RTL statement for inclusion in the current RTL statement group. If a rule corresponding to the current RTL statement group exists, the compiler back-end generates a set of assembly-language statements according to the rule in step 512. Following step 512, the compiler back-end determines whether a next RTL statement requires consideration, in the context of a next RTL statement group. If so, the preferred method returns to step 508; otherwise, the preferred method ends.

Figure 3C:
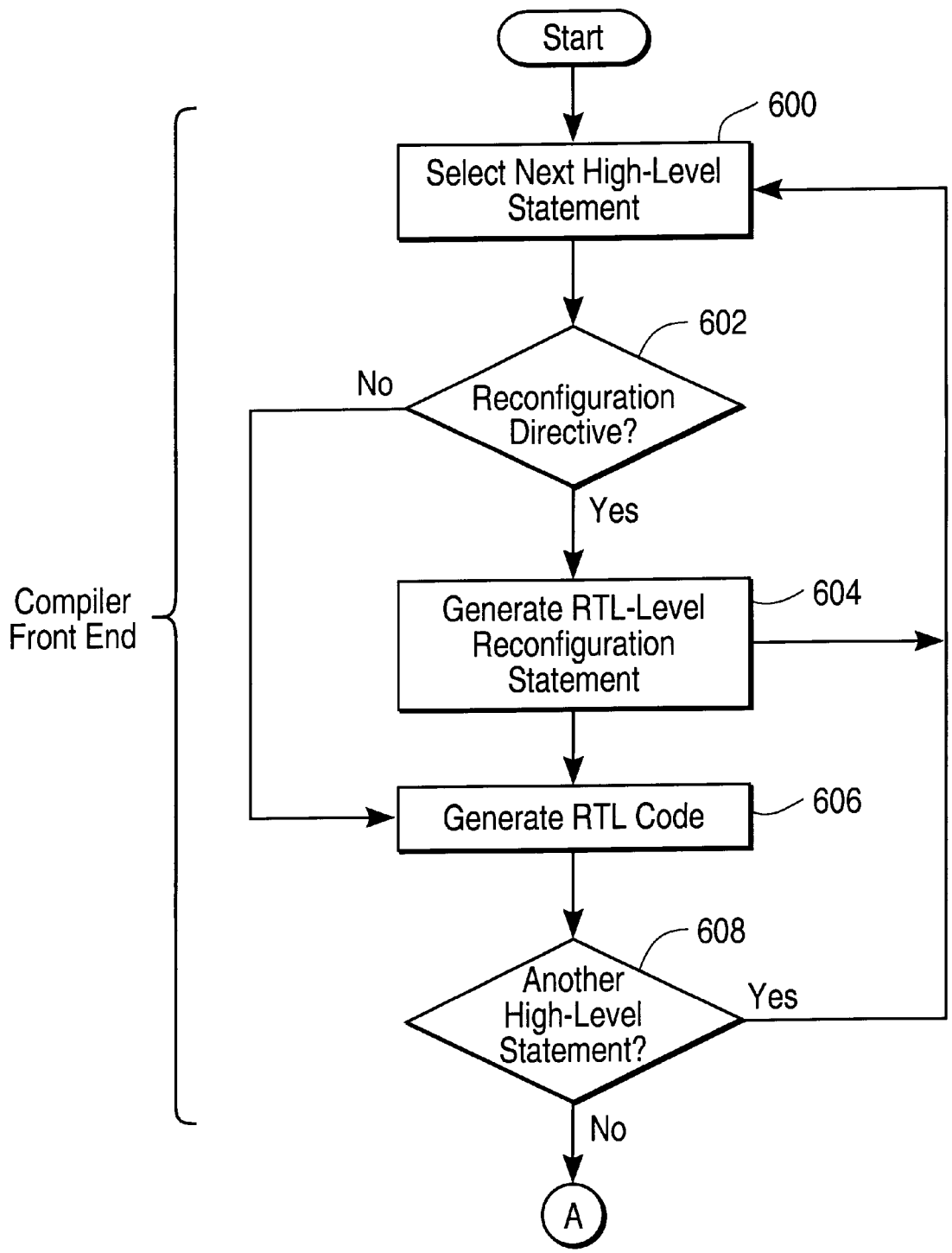
FIGS. 3C and 3D are a flowchart of preferred compiling operations performed by a compiler for dynamically reconfigurable computing.
Figure 3D:
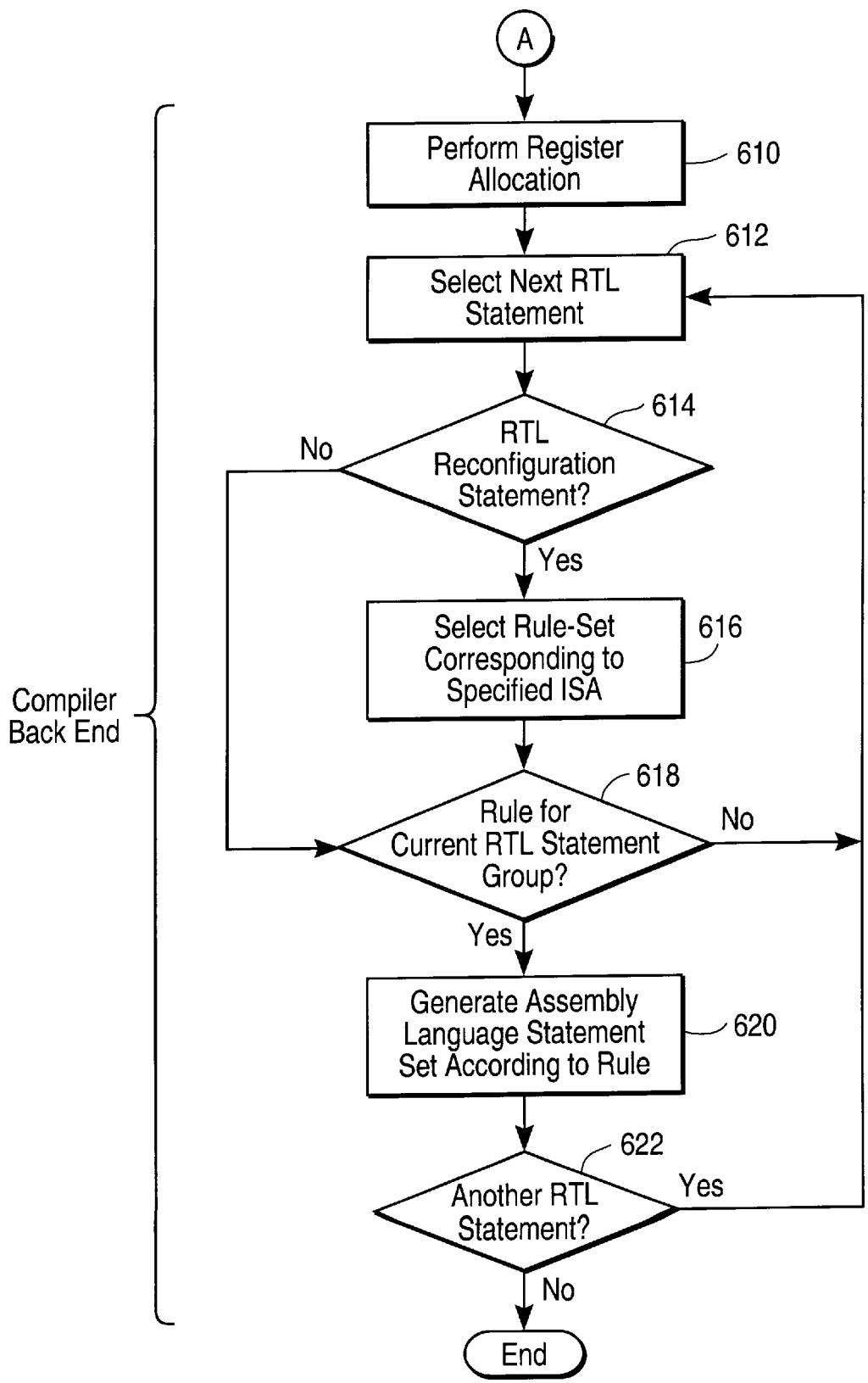

The present invention preferably includes a compiler for dynamically reconfigurable computing. Referring also now to FIGS. 3C and 3D, a flowchart of preferred compiling operations performed by a compiler for dynamically reconfigurable computing is shown. The preferred compiling operations begin in step 600 with the front-end of the compiler for dynamically reconfigurable computing selecting a next high-level statement within a sequence of program instructions. Next, the front-end of the compiler for dynamically reconfigurable computing determines whether the selected high-level statement is a reconfiguration directive in step 602. If so, the front-end of the compiler for dynamically reconfigurable computing generates an RTL reconfiguration statement in step 604, after which the preferred method returns to step 600. In the preferred embodiment, the RTL reconfiguration statement is a nonstandard RTL statement that includes an ISA identification. If in step 602 the selected high-level program statement is a not a reconfiguration directive, the front-end of the compiler for dynamically reconfigurable computing next generates a set of RTL statements in a conventional manner in step 606. After step 606, the front-end of the compiler for dynamically reconfigurable computing determines whether another high-level statement requires consideration in step 608. If so, the preferred method returns to step 600; otherwise, the preferred method proceeds to step 610 to initiate back-end operations.

In step 610, the back-end of the compiler for dynamically reconfigurable computing performs register allocation operations. In the preferred embodiment of the present invention, each ISA is defined such that the register architecture from one ISA to another is consistent; therefore, the register allocation operations are performed in a conventional manner. Those skilled in the art will recognize that in general, a consistent register architecture from one ISA to another is not an absolute requirement. Next, the back-end of the compiler for dynamically reconfigurable computing selects a next RTL statement within a currently-considered RTL statement group in step 612. The back-end of the compiler for dynamically reconfigurable computing then determines in step 614 whether the selected RTL statement is an RTL reconfiguration statement. If the selected RTL statement is not an RTL reconfiguration statement, the back-end of the compiler for dynamically reconfigurable computing determines in step 618 whether a rule exists for the currently-considered RTL statement group. If not, the preferred method returns to step 612 to select a next RTL statement for inclusion in the currently-considered RTL statement group. In the event that a rule exists for the currently-considered RTL statement group in step 618, the back end of the compiler for dynamically reconfigurable computing next generates a set of assembly language statements corresponding to the currently-considered RTL statement group according to this rule in step 620. Following step 620, the back end of the compiler for dynamically reconfigurable computing determines whether another RTL statement requires consideration within the context of a next RTL statement group in step 622. If so, the preferred method returns to step 612; otherwise, the preferred method ends.

If in step 614 the selected RTL statement is an RTL reconfiguration statement, the back-end of the compiler for dynamically reconfigurable computing selects a rule-set corresponding to the ISA identification within the RTL reconfiguration statement in step 616. In the present invention, a unique rule-set preferably exists for each ISA. Each rule-set therefore provides one or more rules for converting groups of RTL statements into assembly language statements in accordance with a particular ISA. Following step 616, the preferred method proceeds to step 618. The rule set corresponding to any given ISA preferably includes a rule for translating the RTL reconfiguration statement into a set of assembly language instructions that produce a software interrupt that results in the execution of a reconfiguration handler, as will be described in detail below.

In the manner described above, the compiler for dynamically reconfigurable computing selectively and automatically generates assembly-language statements in accordance with multiple ISAs during compilation operations. In other words, during the compilation process, the compiler for dynamically reconfigurable computing compiles a single set of program instructions according to a variable ISA. The compiler for dynamically reconfigurable computing is preferably a conventional compiler modified to perform the preferred compiling operations described above with reference to FIGS. 3C and 3D. Those skilled in the art will recognize that while the required modifications are not complex, such modifications are nonobvious in view of both prior art compiling techniques and prior art reconfigurable computing techniques.

Figure 4:
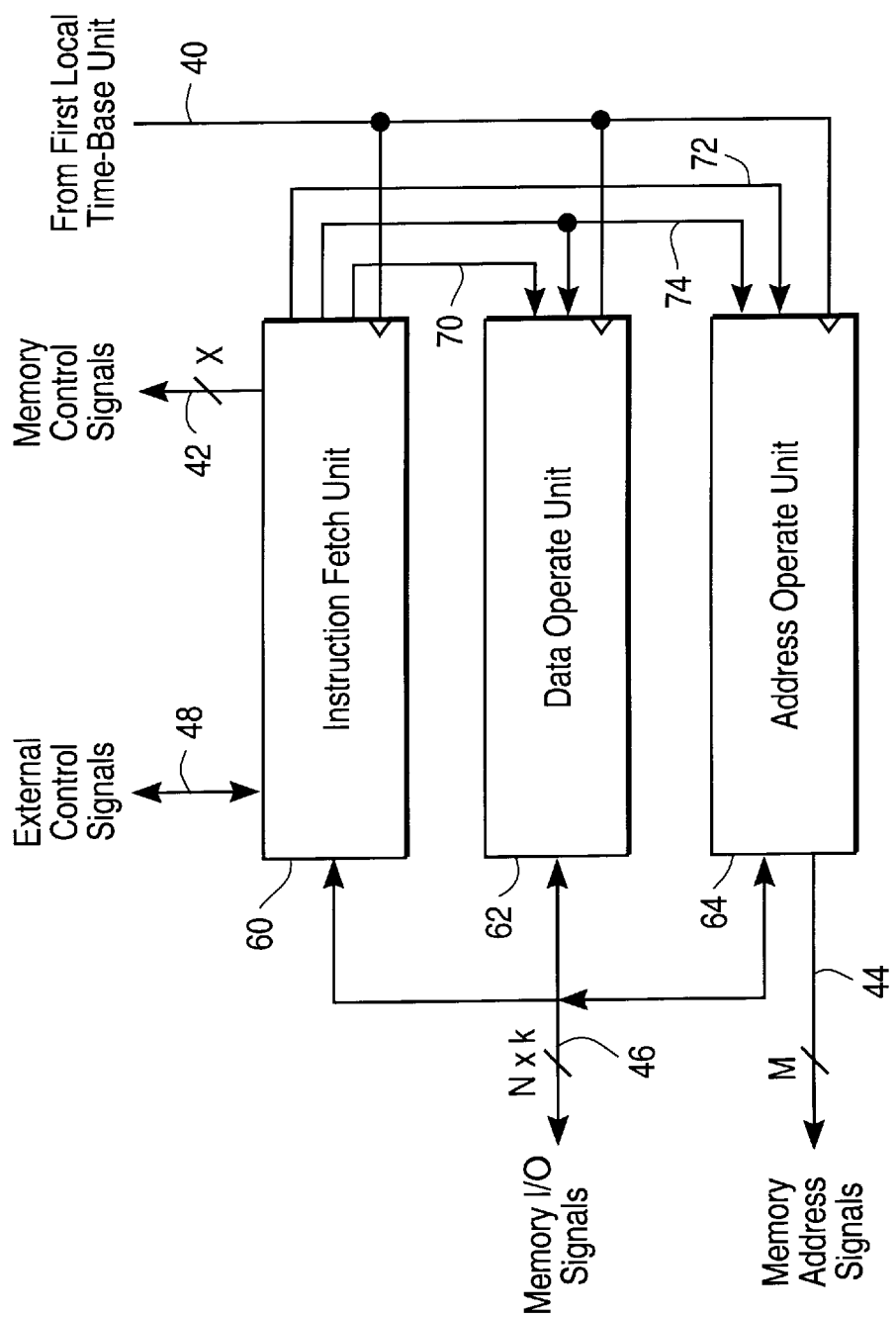
FIG. 4 is a block diagram of a preferred embodiment of a Dynamically Reconfigurable Processing Unit of the present invention.

Referring now to FIG. 4, a block diagram of a preferred embodiment of a Dynamically Reconfigurable Processing Unit 32 is shown. The DRPU 32 comprises an Instruction Fetch Unit (IFU) 60, a Data Operate Unit (DOU) 62, and an Address Operate Unit (AOU) 64. Each of the IFU 60, the DOU 62, and the AOU 64 have a timing input coupled to the first timing signal line 40. The IFU 60 has a memory control output coupled to the memory control line 42, a data input coupled to the memory I/O line 46, and a bidirectional control port coupled to the external control line 48. The IFU 60 additionally has a first control output coupled to a first control input of the DOU 62 via a first control line 70, and a second control output coupled to a first control input of the AOU 64 via a second control line 72. The IFU 60 also has a third control output coupled to a second control input of the DOU 62 and a second control input of the AOU 64 via a third control line 74. The DOU 62 and the AOU 64 each have a bidirectional data port coupled to the memory I/O line 46. Finally, the AOU 64 has an address output that forms the DRPU's address output.

The DRPU 32 is preferably implemented using a reconfigurable or reprogrammable logic device, for example, an FPGA such as a Xilinx XC4013 (Xilinx, Inc., San Jose, Calif.) or an AT&T ORCA™ 1C07 (AT&T Microelectronics, Allentown, Pa.). Preferably, the reprogrammable logic device provides a plurality of: 1) selectively reprogrammable logic blocks, or Configurable Logic Blocks (CLBs); 2) selectively reprogrammable I/O Blocks (IOBs); 3) selectively reprogrammable interconnect structures; 4) data storage resources; 5) tri-state buffer resources; and 6) wired-logic function capabilities. Each CLB preferably includes selectively-reconfigurable circuitry for generating logic functions, storing data, and routing signals. Those skilled in the art will recognize that reconfigurable data storage circuitry may also be included in one or more Data Storage Blocks (DSBs) separate from the set of CLBs, depending upon the exact design of the reprogrammable logic device being used. Herein, the reconfigurable data storage circuitry within an PPGA is taken to be within the CLBs; that is, the presence of DSBs is not assumed. Those skilled in the art will readily recognize that one or more elements described herein that utilize CLB-based reconfigurable data storage circuitry could utilize DSB-based circuitry in the event that DSBs are present. Each IOB preferably includes selectively-reconfigurable circuitry for transferring data between CLBs and an FPGA output pin. A configuration data set defines a DRPU hardware configuration or organization by specifying functions performed within CLBs as well as interconnections: 1) within CLBs; 2) between CLBs; 3) within IOBs; 4) between IOBs; and 5) between CLBs and IOBs. Those skilled in the art will recognize that via a configuration data set, the number of bits in each of the memory control line 42, the address line 44, the memory I/O line 46, and the external control line 48 is reconfigurable. Preferably, configuration data sets are stored in one or more S-machine memories 34 within the system 10. Those skilled in the art will recognize that the DRPU 32 is not limited to an FPGA-based implementation. For example, the DRPU 32 could be implemented as a RAM-based state machine that possibly includes one or more look-up tables. Alternatively, the DRPU 32 could be implemented using a Complex Programmable Logic Device (CPLD). However, those of ordinary skill in the art will realize that the some of the S-machines 12 of the system 10 may have DRPUs 32 that are not reconfigurable.

In the preferred embodiment, the IFU 60, the DOU 62, and the AOU 64 are each dynamically reconfigurable. Thus, their internal hardware configuration can be selectively modified during program execution. The IFU 60 directs instruction fetch and decode operations, memory access operations, DRPU reconfiguration operations, and issues control signals to the DOU 62 and the AOU 64 to facilitate instruction execution. The DOU 62 performs operations involving data computation, and the AOU 64 performs operations involving address computation. The internal structure and operation of each of the IFU 60, the DOU 62, and the AOU 64 will now be described in detail.

Figure 5:
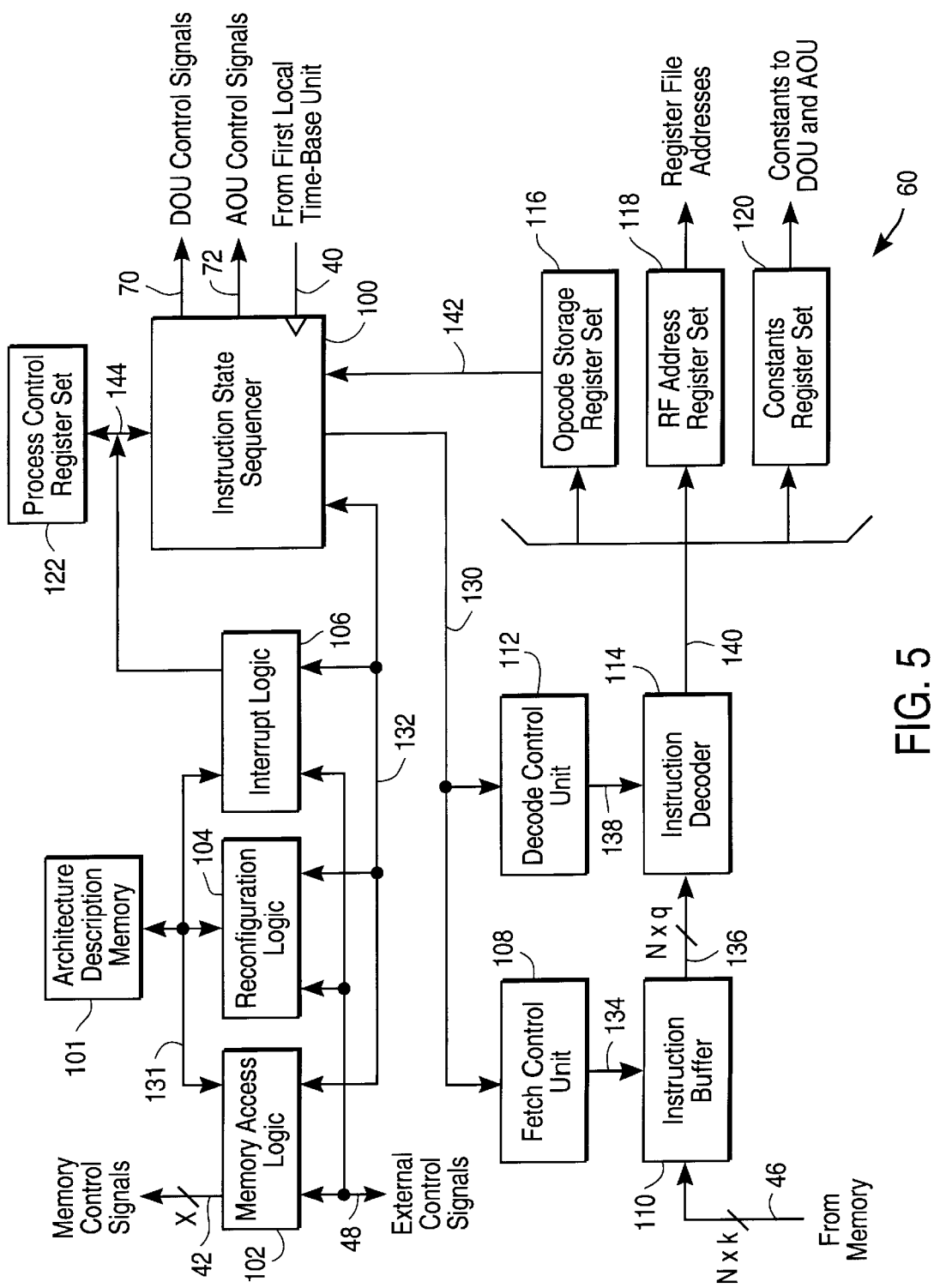
FIG. 5 is a block diagram of a preferred embodiment of an Instruction Fetch Unit of the present invention.

Referring now to FIG. 5, a block diagram of a preferred embodiment of an Instruction Fetch Unit 60 is shown. The IFU 60 comprises an Instruction State Sequencer (ISS) 100, an architecture description memory 101, memory access logic 102, reconfiguration logic 104, interrupt logic 106, a fetch control unit 108, an instruction buffer 110, a decode control unit 112, an instruction decoder 114, an opcode storage register set 116, a Register File (RF) address register set 118, a constants register set 120, and a process control register set 122. The ISS 100 has a first and a second control output that form the IFU's first and second control outputs, respectively, and a timing input that forms the IFU's timing input. The ISS 100 also has a fetch/decode control output coupled to a control input of the fetch control unit 108 and a control input of the decode control unit 112 via a fetch/decode control line 130. The ISS 100 additionally has a bidirectional control port coupled to a first bidirectional control port of each of the memory access logic 102, the reconfiguration logic 104, and the interrupt logic 106 via a bidirectional control line 132. The ISS 100 also has an opcode input coupled to an output of the opcode storage register set 116 via an opcode line 142. Finally, the ISS 100 has a bidirectional data port coupled to a bidirectional data port of the process control register set 122 via a process data line 144.

Each of the memory access logic 102, the reconfiguration logic 104, and the interrupt logic 106 have a second bidirectional control port coupled to the external control line 48. The memory access logic 102, the reconfiguration logic 104, and the interrupt logic 106 additionally each have a data input coupled to a data output of the architecture description memory 101 via an implementation control line 131. The memory access logic 102 additionally has a control output that forms the IFU's memory control output, and the interrupt logic 106 additionally has an output coupled to the process data line 144. The instruction buffer 110 has a data input that forms the IFU's data input, a control input coupled to a control output of the fetch control unit 108 via a fetch control line 134, and an output coupled to an input of the instruction decoder 114 via an instruction line 136. The instruction decoder 114 has a control input coupled to a control output of the decode control unit 112 via a decode control line 138, and an output coupled via a decoded instruction line 140 to 1) an input of the opcode storage register set 116; 2) an input of the RF address register set 118; and 3) an input of the constants register set 120. The RF address register set 118 and the constants register set 120 each have an output that together form the IFU's third control output 74.

The architecture description memory 101 stores architecture specification signals that characterize the current DRPU configuration. Preferably, the architecture specification signals include 1) a reference to a default configuration data set; 2) a reference to a list of allowable configuration data sets; 3) a reference to a configuration data set corresponding to the currently-considered ISA, that is, a reference to the configuration data set that defines the current DRPU configuration; 4) an interconnect address list that identifies one or more interconnect I/O units 304 within the T-machine 14 associated with the S-machine 12 in which the IFU 60 resides, as will be described in detail below with reference to FIG. 13; 5) a set of interrupt response signals that specify interrupt latency and interrupt precision information defining how the IFU 60 responds to interrupts; and 6) a memory access constant that defines an atomic memory address increment. In the preferred embodiment, each configuration data set implements the architecture description memory 101 as a set of CLBs configured as a Read-Only Memory (ROM). The architecture specification signals that define the contents of the architecture description memory 101 are preferably included in each configuration data set. Thus, because each configuration data set corresponds to a particular ISA, the contents of the architecture description memory 101 varies according to the ISA currently under consideration. For a given ISA, program access to the contents of the architecture description memory 101 is preferably facilitated by the inclusion of a memory read instruction in the ISA. This enables a program to retrieve information about the current DRPU configuration during program execution.

In the present invention, the reconfiguration logic 104 is a state machine that controls a sequence of reconfiguration operations that facilitate reconfiguration of the DRPU 32 according to a configuration data set. Preferably, the reconfiguration logic 104 initiates the reconfiguration operations upon receipt of a reconfiguration signal. As will be described in detail below, the reconfiguration signal is generated by the interrupt logic 106 in response to a reconfiguration interrupt received on the external control line 48, or by the ISS 100 in response to a reconfiguration directive embedded within a program. The reconfiguration operations provide for an initial DRPU configuration following a power-on/reset condition using the default configuration data set referenced by the architecture description memory 101. The reconfiguration operations also provide for selective DRPU reconfiguration after the initial DRPU configuration has been established. Upon completion of the reconfiguration operations, the reconfiguration logic 104 issues a completion signal. In the preferred embodiment, the reconfiguration logic 104 is non-reconfigurable logic that controls the loading of configuration data sets into the reprogrammable logic device itself, and thus the sequence of reconfiguration operations is defined by the reprogrammable logic device manufacturer. The reconfiguration operations will therefore be known to those skilled in the art.

Each DRPU configuration is preferably given by a configuration data set that defines a particular hardware organization dedicated to the implementation of a corresponding ISA. In the preferred embodiment, the IFU 60 includes each of the elements indicated above, regardless of DRPU configuration. At a basic level, the functionality provided by each element within the IFU 60 is independent of the currently-considered ISA. However, in the preferred embodiment, the detailed structure and functionality of one or more elements of the IFU 60 may vary based upon the nature of the ISA for which it has been configured. In the preferred embodiment, the structure and functionality of the architecture description memory 101 and the reconfiguration logic 104 preferable remain constant from one DRPU configuration to another. The structure and functionality of the other elements of the IFU 60 and the manner in which they vary according to ISA type will now be described in detail.

The process control register set 122 stores signals and data used by the ISS 100 during instruction execution. In the preferred embodiment, the process control register set 122 comprises a register for storing a process control word, a register for storing an interrupt vector, and a register for storing a reference to a configuration data set. The process control word preferably includes a plurality of condition flags that can be selectively set and reset based upon conditions that occur during instruction execution. The process control word additionally includes a plurality of transition control signals that define one or more manners in which interrupts can be serviced, as will be described in detail below. In the preferred embodiment, the process control register set 122 is implemented as a set of CLBs configured for data storage and gating logic.

The ISS 100 is preferably a state machine that controls the operation of the fetch control unit 108, the decode control unit 112, the DOU 62 and the AOU 64, and issues memory read and memory write signals to the memory access logic 102 to facilitate instruction execution. Referring now to FIG.

6, a state diagram showing a preferred set of states supported by the ISS 100 is shown. Following at power-on or reset condition, or immediately after reconfiguration has occurred, the ISS 100 begins operation in state P. In response to the completion signal issued by the reconfiguration logic 104, the ISS 100 proceeds to state S, in which the ISS initializes or restores program state information in the event that a power-on/reset condition or a reconfiguration has occurred, respectively. The ISS 100 next advances to state F, in which instruction fetch operations are performed. In the instruction fetch operations, the ISS 100 issues a memory read signal to the memory access logic 102, issues a fetch signal to the fetch control unit 108, and issues an increment signal to the AOU 64 to increment a Next Instruction Program Address Register (NIPAR) 232, as will be described in detail below with reference to FIGS. 11A and 11B. After state F, the ISS 100 advances, to state D to initiate instruction decoding operations. In state D, the ISS 100 issues a decode signal to the decode control unit 112. While in state D, the ISS 100 additionally retrieves an opcode corresponding to a decoded instruction from the opcode storage register set 116. Based upon the retrieved opcode, the ISS 100 proceeds to state E or to state M to perform instruction execution operations. The ISS 100 advances to state E in the event that the instruction can be executed in a single clock cycle; otherwise, the ISS 100 advances to state M for multicycle instruction execution. In the instruction execution operations, the ISS 100 generates DOU control signals, AOU control signals, and/or signals directed to the memory access logic 102 to facilitate the execution of the instruction corresponding to the retrieved opcode. Following either of states E or M, the ISS 100 advances to state W. In state W, the ISS 100 generates DOU control signals, AOU control signals, and/or memory write signals to facilitate storage of an instruction execution result. State W is therefore referred to as a write-back state. Those skilled in the art will recognize that states F, D, E or M, and W comprise a complete instruction execution cycle. After state W, the ISS 100 advances to state Y in the event that suspension of instruction execution is required. State Y corresponds to an idle state, which may be required, for example, in the event that a T-machine 14 requires access to the S-machine's memory 34. Following state Y, or after state W in the event that instruction execution is to continue, the ISS 100 returns to state F to resume another instruction execution cycle.

Figure 6:
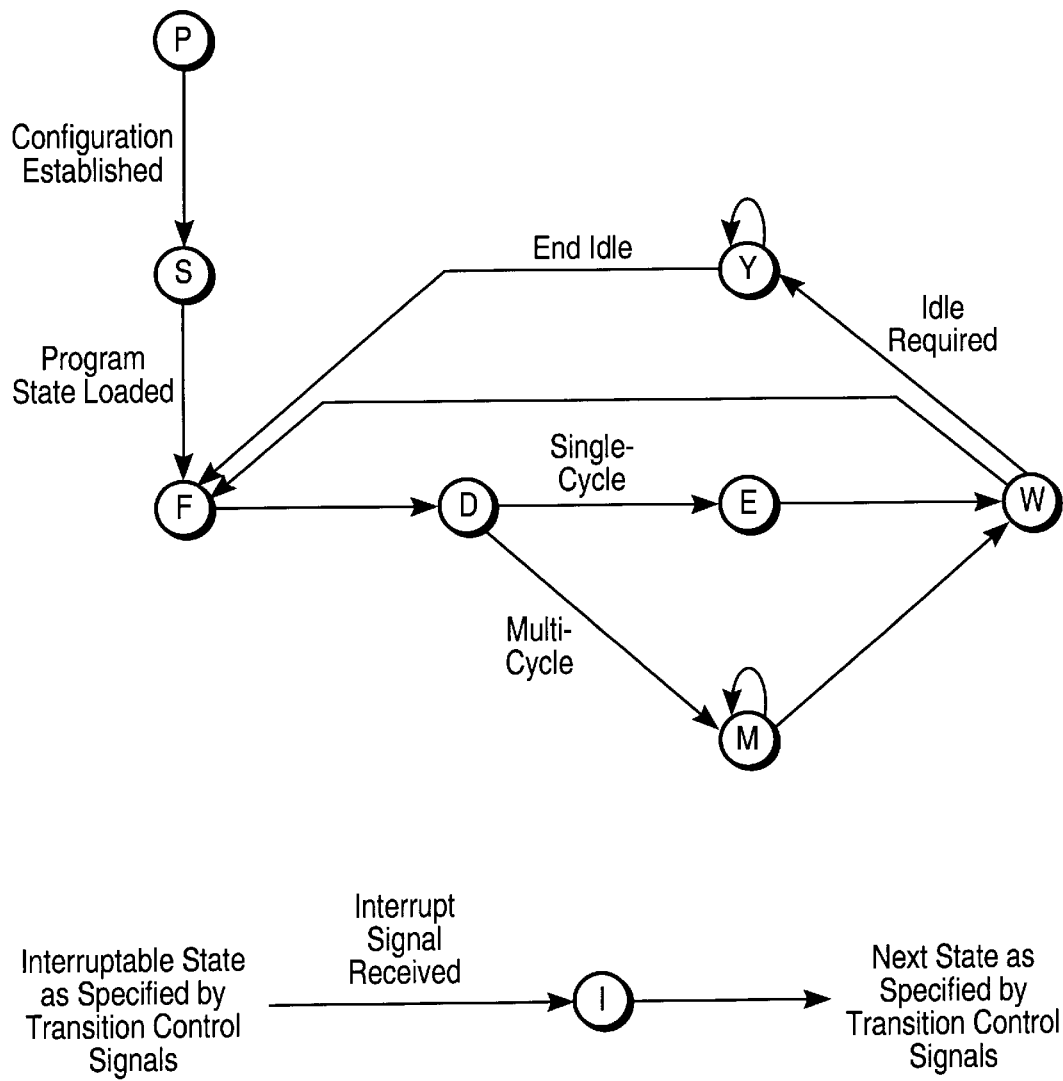
FIG. 6 is a state diagram showing a preferred set of states supported by an Instruction State Sequencer of the present invention.

As shown in FIG. 6, the state diagram also includes state I, which is defined to be an interrupt service state. In the present invention, the ISS 100 receives interrupt notification signals from the interrupt logic 106. As will be described in detail below with reference to FIG. 7, the interrupt logic 106 generates transition control signals, and stores the transition control signals in the process control word within the process control register set 122. The transition control signals preferably indicate which of the states F, D, E, M, W, and Y are interruptable, a level of interrupt precision required in each interruptable state, and for each interruptable state a next state at which instruction execution is to continue following state I. If the ISS 100 receives an interrupt notification signal while in a given state, the ISS 100 advances to state I if the transition control signals indicate that the current state is interruptable. Otherwise, the ISS 100 advances as if no interrupt signal has been received, until reaching an interruptable state.

Once the ISS 100 has advanced to state I, the ISS 100 preferably accesses the process control register set 122 to set an interrupt masking flag and retrieve an interrupt vector. After retrieving the interrupt vector, the ISS 100 preferably services the current interrupt via a conventional subroutine jump to an interrupt handler as specified by the interrupt vector.

In the present invention, reconfiguration of the DRPU 32 is initiated in response to 1) a reconfiguration interrupt asserted upon the external control line 48; or 2) the execution of a reconfiguration directive within a sequence of program instructions. In the preferred embodiment, both the reconfiguration interrupt and the execution of a reconfiguration directive result in a subroutine jump to a reconfiguration handler. Preferably, the reconfiguration handler saves program state information, and issues a configuration data set address and the reconfiguration signal to the reconfiguration logic 104.

In the event that the current interrupt is not a reconfiguration interrupt, the ISS 100 advances to a next state as indicated by the transition control signals once the interrupt has been serviced, thereby resuming, completing, or initiating an instruction execution cycle.

In the preferred embodiment, the set of states supported by the ISS 100 varies according to the nature of the ISA for which the DRPU 32 is configured. Thus, state M would not be present for an ISA in which one or more instructions can be executed in a single clock cycle, as would be the case with a typical inner-loop ISA. As depicted, the state diagram of FIG. 6 preferably defines the states supported by the ISS 100 for implementing a general-purpose outer-loop ISA. For the implementation of an inner-loop ISA, the ISS 100 preferably supports multiple sets of states F, D, E, and W in parallel, thereby facilitating pipelined control of instruction execution in a manner that will be readily understood by those skilled in the art. In the preferred embodiment, the ISS 100 is implemented as a CLB-based state machine that supports the states or a subset of the states described above, in accordance with the currently-considered ISA.

Figure 7:
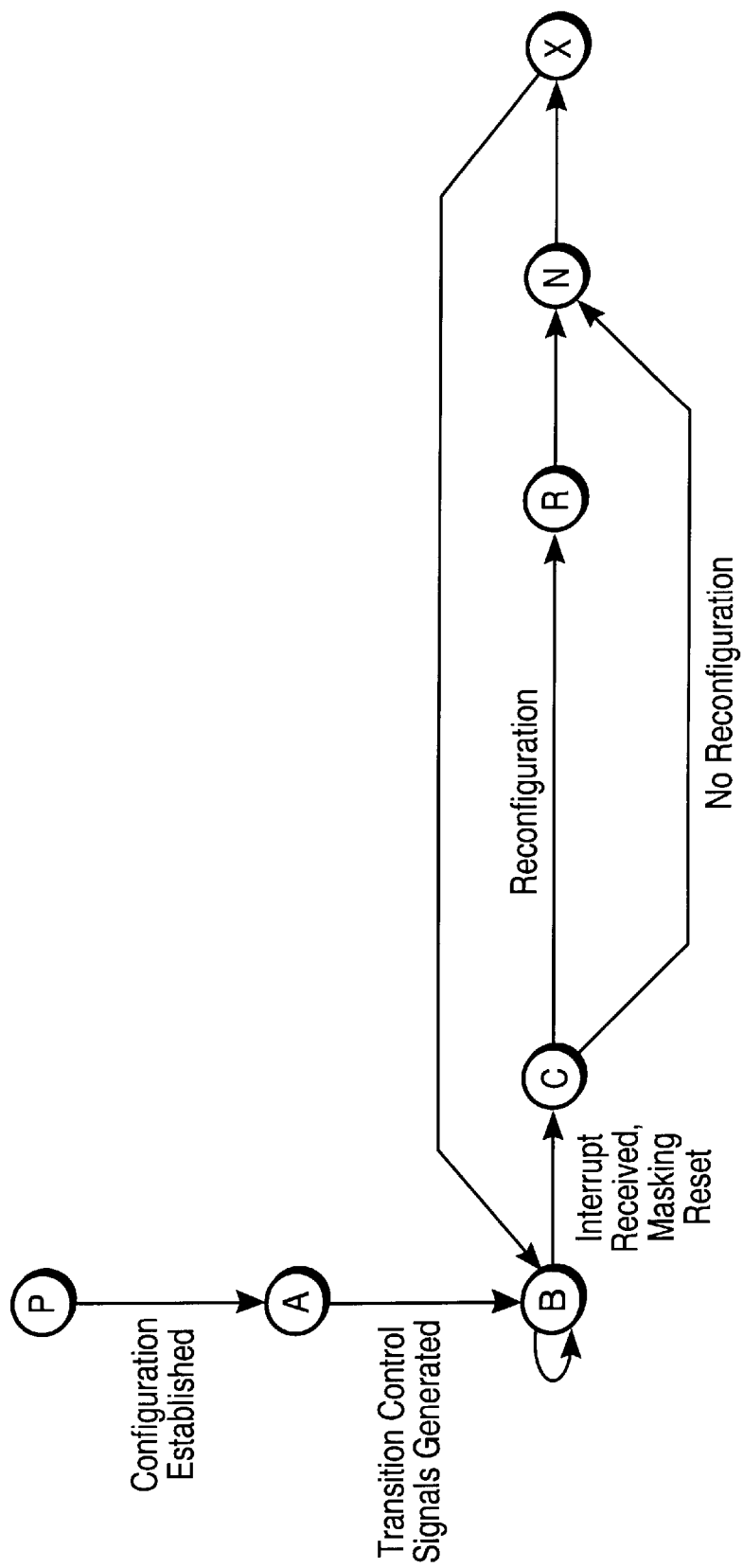
FIG. 7 is a state diagram showing a preferred set of states supported by interrupt logic of the present invention.

The interrupt logic 106 preferably comprises a state machine that generates transition control signals, and performs interrupt notification operations in response to an interrupt signal received via the external control line 48. Referring now to FIG. 7, a state diagram showing a preferred set of states supported by the interrupt logic 106 is shown. The interrupt logic 106 begins operation in state P. State P corresponds to a power-on, reset, or reconfiguration condition. In response to the completion signal issued by the reconfiguration logic 104, the interrupt logic 106 advances to state A and retrieves the interrupt response signals from the architecture description memory 101. The interrupt logic 106 then generates the transition control signals from the interrupt response signals, and stores the transition control signals in the process control register set 122. In the preferred embodiment, the interrupt logic 106 includes a CLB-based Programmable Logic Array (PLA) for receiving the interrupt response signals and generating the transition control signals. Following state A, the interrupt logic 106 advances to state B to wait for an interrupt signal. Upon receipt of an interrupt signal, the interrupt logic 106 advances to state C in the event that the interrupt masking flag within the process control register set 122 is reset. Once in state C, the interrupt logic 106 determines the origin of the interrupt, an interrupt priority, and an interrupt handler address. In the event that the interrupt signal is a reconfiguration interrupt, the interrupt logic 106 advances to state R and stores a configuration data set address in the process control register set 122. After state R, or following state C in the event that the interrupt signal is not a reconfiguration interrupt, the interrupt logic 106 advances to state N and stores the interrupt handler address in the process control register set 122. The interrupt logic 106 next advances to state X, and issues an interrupt notification signal to the ISS 100. Following state X, the interrupt logic 122 returns to state B to wait for a next interrupt signal.

In the preferred embodiment, the level of interrupt latency as specified by the interrupt response signals, and hence the transition control signals, varies according to the current ISA for which the DRPU 32 has been configured. For example, an ISA dedicated to high-performance real-time motion control requires rapid and predictable interrupt response capabilities. The configuration data set corresponding to such an ISA therefore preferably includes interrupt response signals that indicate low-latency interruption is required. The corresponding transition control signals in turn preferably identify multiple ISS states as interruptable, thereby allowing an interrupt to suspend an instruction execution cycle prior to the instruction execution cycle's completion. In contrast to an ISA dedicated to real-time motion control, an ISA dedicated to image convolution operations requires interrupt response capabilities that ensure that the number of convolution operations performed per unit time is maximized. The configuration data set corresponding to the image convolution ISA preferably includes interrupt response signals that specify high-latency interruption is required. The corresponding transition control signals preferably identify state W as being interruptable. In the event that the ISS 100 supports multiple sets of states F, D, E, and W in parallel when configured to implement the image convolution ISA, the transition control signals preferably identify each state W as being interruptable, and further specify that interrupt servicing is to be delayed until each of the parallel instruction execution cycles have completed their state W operations. This ensures that an entire group of instructions will be executed before an interrupt is serviced, thereby maintaining reasonable pipelined execution performance levels.

In a manner analogous to the level of interrupt latency, the level of interrupt precision as specified by the interrupt response signals also varies according to the ISA for which the DRPU 32 is configured. For example, in the event that state M is defined to be an interruptable state for an outer-loop ISA that supports interruptable multicycle operations, the interrupt response signals preferably specify that precise interrupts are required. The transition control signals thus specify that interrupts received in state M are treated as precise interrupts to ensure that multicycle operations can be successfully restarted. As another example, for an ISA which supports nonfaultable pipelined arithmetic operations, the interrupt response signals preferably specify that imprecise interrupts are required. The transition control signals then specify that interrupts received in state W are treated as imprecise interrupts.

For any given ISA, the interrupt response signals are defined, or programmed, by a portion of the ISA's corresponding configuration data set. Via the programmable interrupt response signals and the generation of corresponding transition control signals, the present invention facilitates the implementation of an optimum interruption scheme on an ISA-by-ISA basis. Those skilled in the art will recognize that the vast majority of prior art computer architectures do not provide for the flexible specification of interruption capabilities, namely, programmable state transition enabling, programmable interrupt latency, and programmable interrupt precision. In the preferred embodiment, the interrupt logic 106 is implemented as a CLB-based state machine that supports the states described above.

The fetch control unit 108 directs the loading of instructions into the instruction buffer 110 in response to the fetch signal issued by the ISS 100. In the preferred embodiment, the fetch control unit 108 is implemented as a conventional one-hot encoded state machine using flip-flops within a set of CLBs. Those skilled in the art will recognize that in an alternate embodiment, the fetch control unit 108 could be configured as a conventional encoded state machine or as a ROM-based state machine. The instruction buffer 110 provides temporary storage for instructions loaded from the memory 34. For the implementation of an outer-loop ISA, the instruction buffer 110 is preferably implemented as a conventional RAM-based First In, First Out (FIFO) buffer using a plurality of CLBs. For the implementation of an inner-loop ISA, the instruction buffer 110 is preferably implemented as a set of flip-flop registers using a plurality of flip-flops within a set of IOBs or a plurality of flip-flops within both IOBs and CLBs.

The decode control unit 112 directs the transfer of instructions from the instruction buffer 110 into the instruction decoder 114 in response to the decode signal issued by the ISS 100. For an inner-loop ISA, the decode control unit 112 is preferably implemented as a ROM-based state machine comprising a CLB-based ROM coupled to a CLB-based register. For an outer-loop ISA, the decode control unit 112 is preferably implemented as a CLB-based encoded state machine. For each instruction received as input, the instruction decoder 114 outputs a corresponding opcode, a register file address, and optionally one or more constants in a conventional manner. For an inner-loop ISA, the instruction decoder 114 is preferably configured to decode a group of instructions received as input. In the preferred embodiment, the instruction decoder 114 is implemented as a CLB-based decoder configured to decode each of the instructions included in the ISA currently under consideration.

The opcode storage register set 116 provides temporary storage for each opcode output by the instruction decoder 144, and outputs each opcode to the ISS 100. When an outer-loop ISA is implemented in the DRPU 32, the opcode storage register set 116 is preferably implemented using an optimum number of flip-flop register banks. The flip-flop register banks receive signals from the instruction decoder 114 that represent class or group codes derived from opcode literal bitfields from instructions previously queued through the instruction buffer 110. The flip-flop register banks store the aforementioned class or group codes according to a decoding scheme that preferably minimizes ISS complexity. In the case of an inner-loop ISA, the opcode storage register set 116 preferably stores opcode indication signals that are more directly derived from opcode literal bitfields output by the instruction decoder 114. Inner-loop ISAs necessarily have smaller opcode literal bitfields, thereby minimizing the implementation requirements for buffering, decoding, and opcode indication for instruction sequencing by the instruction buffer 110, the instruction decoder 114, and the opcode storage register set 116, respectively. In summary, for outer-loop ISAs, the opcode storage register set 116 is preferably implemented as a small federation of flip-flop register banks characterized by a bitwidth equal to or a fraction of the opcode literal size. For inner-loop ISAs, the opcode storage register set 116 is preferably a smaller and more unified flip-flop register bank than for outer-loop ISAs. The reduced flip-flop register bank size in the inner-loop case reflects the minimal instruction count characteristic of inner-loop ISAs relative to outer-loop ISAs.

The RF address register set 118 and the constants register set 120 provide temporary storage for each register file address and each constant output by the instruction decoder 114, respectively. In the preferred embodiment, the opcode storage register set 116, the RF address register set 118, and the constants register set 120 are each implemented as a set of CLBs configured for data storage.

The memory access logic 102 is memory control circuitry that directs and synchronizes the transfer of data between the memory 34, the DOU 62, and the AOU 64 according to the atomic memory address size specified in the architecture description memory 122. The memory access logic 102 additionally directs and synchronizes the transfer of data and commands between the S-machine 12 and a given T-machine 14. In the preferred embodiment, the memory access logic 102 supports burst-mode memory accesses, and is preferably implemented as a conventional RAM controller using CLBs. Those skilled in the art will recognize that during reconfiguration, the input and output pins of the reconfigurable logic device will be three-stated, allowing resistive terminations to define unasserted logic levels, and hence will not perturb the memory 34. In an alternate embodiment, the memory access logic 102 could be implemented external to the DRPU 32.

Figure 8:
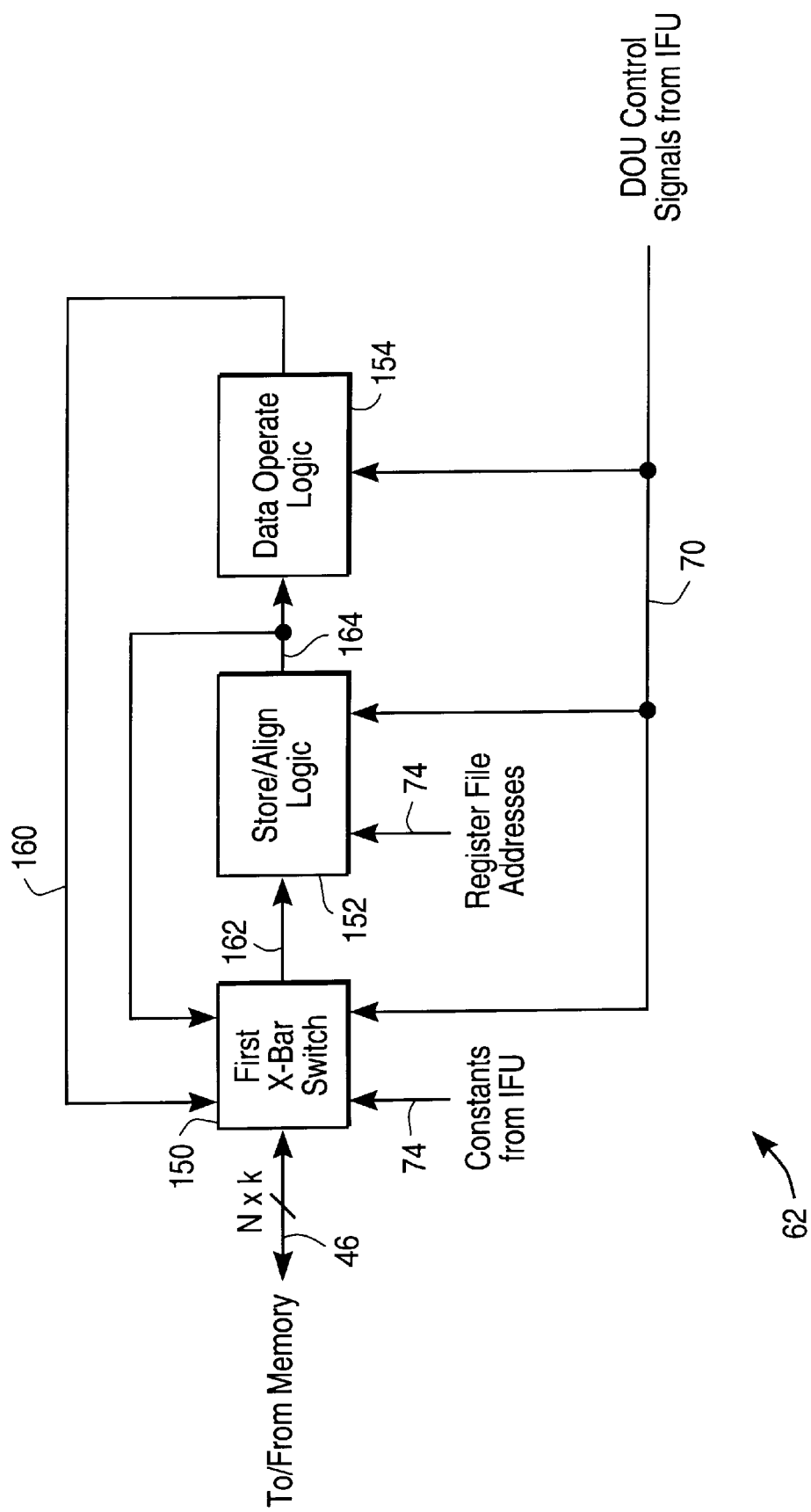
FIG. 8 is a block diagram of a preferred embodiment of a Data Operate Unit of the present invention.

Referring now to FIG. 8, a block diagram of a preferred embodiment of the Data Operate Unit 62 is shown. The DOU 62 performs operations upon data according to DOU control signals, RF addresses, and constants received from the ISS 100. The DOU 62 comprises a DOU cross-bar switch 150, store/align logic 152, and data operate logic 154. Each of the DOU cross-bar switch 150, the store/align logic 152, and the data operate logic 154 have a control input coupled to the first control output of the IFU 60 via the first control line 70. The DOU cross-bar switch 150 has a bidirectional data port that forms the DOU's bidirectional data port; a constants input coupled to the third control line 74; a first data feedback input coupled to a data output of the data operate logic 154 via a first data line 160; a second data feedback input coupled to a data output of the store/align logic 152 via a second data line 164; and a data output coupled to a data input of the store/align logic 152 via a third data line 162. In addition to its data output, the store/align logic 154 has an address input coupled to the third control line 74. The data operate logic 154 additionally has a data input coupled to the store/align logic's output via the second data line 164.

The data operate logic 154 performs arithmetic, shifting, and/or logical operations upon data received at its data input in response to the DOU control signals received at its control input. The store/align logic 152 comprises data storage elements that provide temporary storage for operands, constants, and partial results associated with data computations, under the direction of RF addresses and DOU control signals received at its address input and control input, respectively. The DOU cross-bar switch 150 is preferably a conventional cross-bar switch network that facilitates the loading of data from the memory 34, the transfer of results output by the data operate logic 154 to the store/align logic 152 or the memory 34, and the loading of constants output by the IFU 60 into the store/align logic 152 in accordance with the DOU control signals received at its control input. In the preferred embodiment, the detailed structure of the data operate logic 154 is dependent upon the types of operations supported by the ISA currently under consideration. That is, the data operate logic 154 comprises circuitry for performing the arithmetic and/or logical operations specified by the data-operate instructions within the currently-considered ISA. Similarly, the detailed structure of the store/align logic 152 and the DOU cross-bar switch 150 is dependent upon the ISA currently under consideration. The detailed structure of the data operate logic 154, the store/align logic 152, and the DOU cross-bar switch 150 according to ISA type is described hereafter with reference to FIGS. 9A and 9B.

Figure 9A:
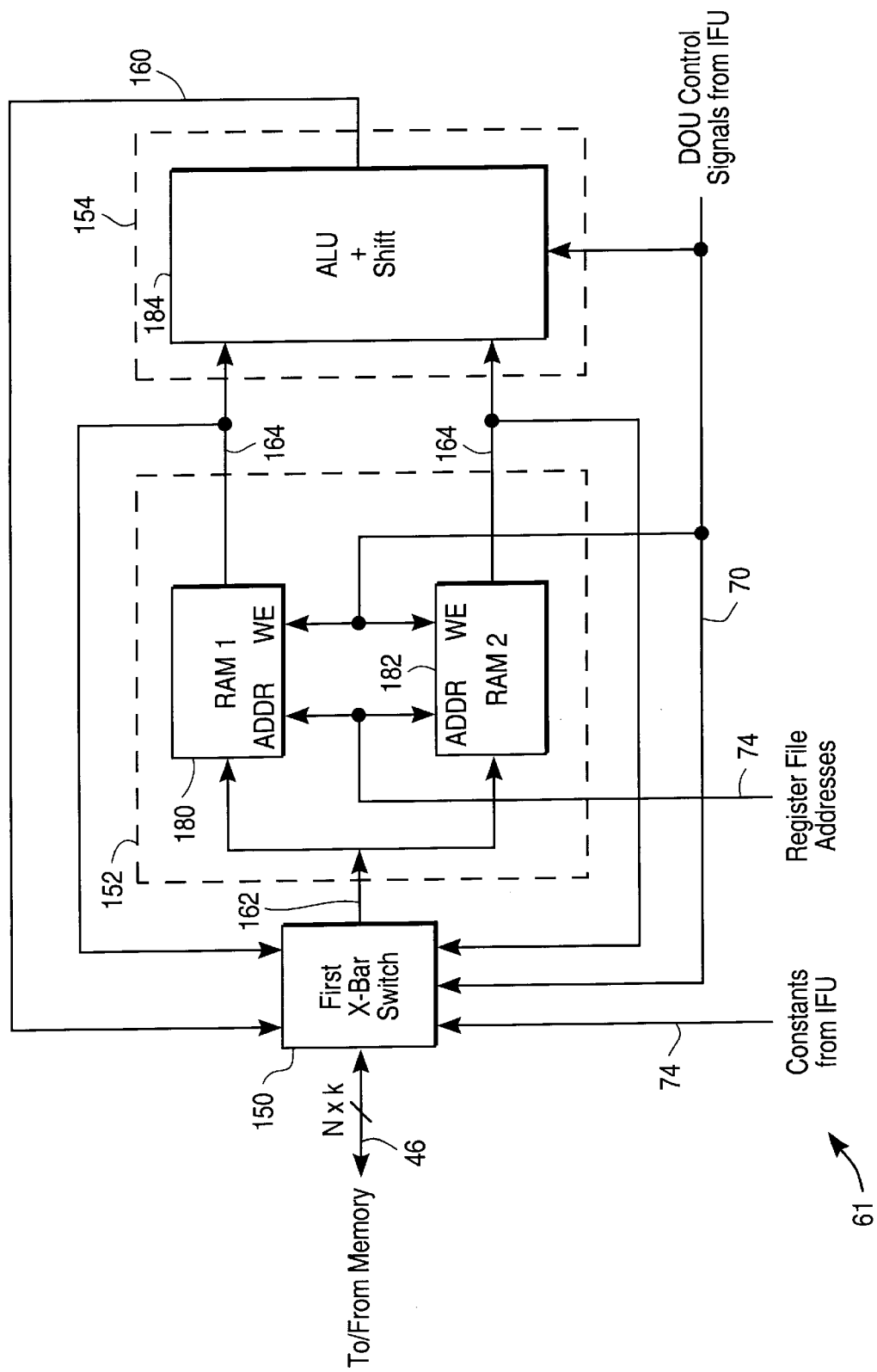
FIG. 9A is a block diagram of a first exemplary embodiment of the Data Operate Unit configured for the implementation of a general-purpose outer-loop Instruction Set Architecture.

For an outer-loop ISA, the DOU 62 is preferably configured to perform serial operations upon data. Referring now to FIG. 9A, a block diagram of a first exemplary embodiment of the DOU 61 configured for the implementation of a general-purpose outer-loop ISA is shown. A general-purpose outer-loop ISA requires hardware configured for performing mathematical operations such as multiplication, addition, and subtraction; Boolean operations such as AND, OR, and NOT; shifting operations; and rotating operations. Thus, for the implementation of a general-purpose outer-loop ISA, the data operate logic 154 preferably comprises a conventional Arithmetic-Logic Unit (ALU)/shifter 184 having a first input, a second input, a control input, and an output. The Store/Align logic 152 preferably comprises a first RAM 180 and a second RAM 182, each of which has a data input, a data output, an address-select input, and an enable input. The DOU cross-bar switch 150 preferably comprises a conventional cross-bar switch network having both bidirectional and unidirectional cross-bar couplings, and having the inputs and outputs previously described with reference to FIG. 8. Those skilled in the art will recognize that an efficient implementation of the DOU cross-bar switch 150 for an outer-loop ISA may include multiplexors, tri-state buffers, CLB-based logic, direct wiring, or subsets of the aforementioned elements joined in any combination by virtue of reconfigurable coupling means. For an outer-loop ISA, the DOU cross-bar switch 150 is implemented to expedite serial data movement in a minimum possible time, while also providing a maximum number of unique data movement cross-bar couplings to support generalized outer-loop instruction types.

The data input of the first RAM 180 is coupled to the data output of the DOU cross-bar switch 150, as is the data input of the second RAM 182, via the third data line 162. The address-select inputs of the first RAM 180 and the second RAM 182 are coupled to receive register file addresses from the IFU 60 via the third control line 74. Similarly, the enable inputs of the first and second RAM 180, 182 are coupled to receive DOU control signals via the first control line 70. The data outputs of the first and second RAM 180, 182 are coupled to the first input and the second input of the ALU/shifter 184, respectively, and are also coupled to the second data feedback input of the DOU cross-bar switch 150. The control input of the ALU/shifter 184 is coupled to receive DOU control signals via the first control line 70, and the output of the ALU/shifter 184 is coupled to the first data feedback input of the DOU cross-bar switch 150. The couplings to the remaining inputs and outputs of the DOU cross-bar switch 150 are identical to those given in the description above with reference to FIG. 8.

To facilitate the execution of a data-operate instruction, the IFU 60 issues DOU control signals, RF addresses, and constants to the DOU 61 during either of ISS states E or M. The first and second RAM 180, 182 provide a first and second register file for temporary data storage, respectively. Individual addresses within the first and second RAM 180, 182 are selected according to the RF addresses received at each RAM's respective address-select input. Similarly, loading of the first and second RAM 180, 182 is controlled by the DOU control signals each respective RAM 180, 182 receives at its write-enable input. In the preferred embodiment, at least one RAM 180, 182 includes a pass-through capability to facilitate the transfer of data from the DOU cross-bar switch 150 directly into the ALU/shifter 184. The ALU/shifter 184 performs arithmetic, logical, or shifting operations upon a first operand received from the first RAM 180 and/or a second operand received from the second RAM 182, under the direction of the DOU control signals received at its control input. The DOU cross-bar switch 150 selectively routes: 1) data between the memory 34 and the first and second RAM 180, 182; 2) results from the ALU/shifter 184 to the first and second RAM 180, 182 or the memory 34; 3) data stored in the first or second RAM 180, 182 to the memory 34; and 4) constants from the IFU 60 to the first and second RAM 180, 182. As previously described, in the event that either the first or second RAM 180, 182 includes a pass-through capability, the DOU cross-bar switch 150 also selectively routes data from the memory 34 or the ALU/shifter's output directly back into the ALU/shifter 184. The DOU cross-bar switch 150 performs a particular routing operation according to the DOU control signals received at its control input. In the preferred embodiment, the ALU/shifter 184 is implemented using logic function generators within a set of CLBs and circuitry dedicated to mathematical operations within the reconfigurable logic device. The first and second RAM 180, 182 are each preferably implemented using the data storage circuitry present within a set of CLBs, and the DOU cross-bar switch 150 is preferably implemented in the manner previously described.

Figure 9B:
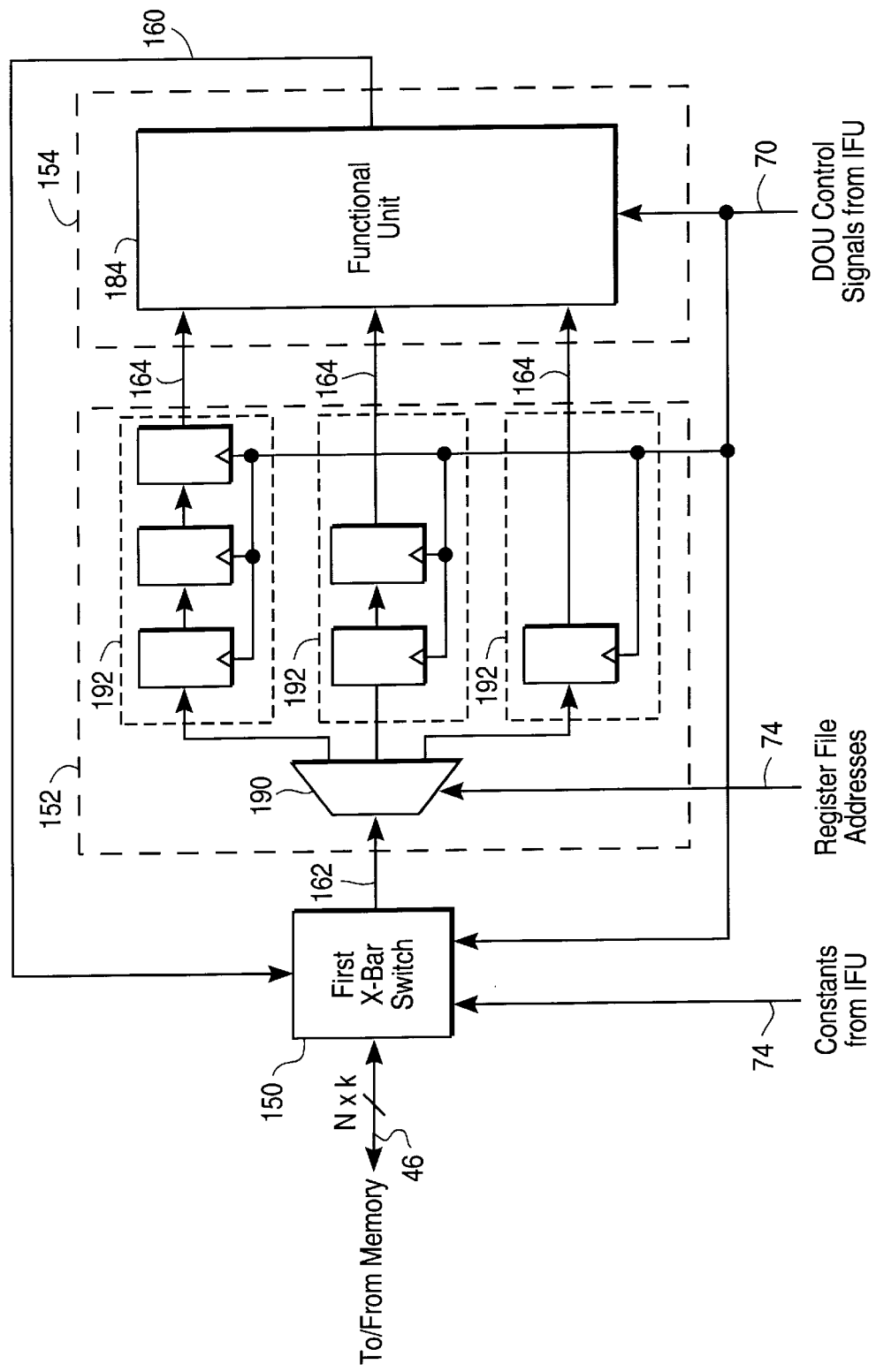
FIG. 9B is a block diagram of a second exemplary embodiment of the Data Operate Unit configured for the implementation of an inner-loop Instruction Set Architecture.

Referring now to FIG. 9B, a block diagram of a second exemplary embodiment of the DOU 63 configured for the implementation of an inner-loop ISA is shown. In general, an inner-loop ISA supports relatively few, specialized operations, and is preferably used to perform a common set of operations upon potentially large data sets. Optimum computational performance for an inner-loop ISA is therefore produced by hardware configured to perform operations in parallel. Thus, in the second exemplary embodiment of the DOU 63, the data operate logic 154, the store/align logic 152, and the DOU cross-bar switch 150 are configured to perform pipelined computations. The data operate logic 154 comprises a pipelined functional unit 194 having a plurality of inputs, a control input, and an output. The store/align logic 152 comprises: 1) a set of conventional flip-flop arrays 192, each flip-flop array 192 having a data input, a data output, and a control input; and 2) a data selector 190 having a control input, a data input, and a number of data outputs corresponding to the number of flip-flop arrays 192 present. The DOU cross-bar switch 150 comprises a conventional cross-bar switch network having duplex unidirectional crossbar couplings. In the second exemplary embodiment of the DOU 63, the DOU cross-bar switch 150 preferably includes the inputs and outputs previously described with reference to FIG. 8, with the exception of the second data feedback input. In a manner analogous to the outer-loop ISA case, an efficient implementation of the DOU cross-bar switch 150 for an inner-loop ISA may include multiplexors, tri-state buffers, CLB-based logic, direct wiring, or a subset of the aforementioned elements coupled in a reconfigurable manner. For an inner-loop ISA, the DOU cross-bar switch 150 is preferably implemented to maximize parallel data movement in a minimum amount of time, while also providing a minimum number of unique data movement cross-bar couplings to support heavily pipelined inner-loop ISA instructions.

The data input of the data selector 190 is coupled to the data output of the DOU cross-bar switch 150 via the first data line 162. The control input of the data selector 190 is coupled to receive RF addresses via the third control line 74, and each output of the data selector 190 is coupled to a corresponding flip-flop array data input. The control input of each flip-flop array 192 is coupled to receive DOU control signals via the first control line 70, and each flip-flop array data output is coupled to an input of the functional unit 194. The control input of the functional unit 194 is coupled to receive DOU control signals via the first control line 70, and the output of the functional unit 194 is coupled to the first data feedback input of the DOU cross-bar switch 150. The couplings of the remaining inputs and outputs of the DOU cross-bar switch 150 are identical to those previously described with reference to FIG. 8.

In operation, the functional unit 194 performs pipelined operations upon data received at its data inputs in accordance with the DOU control signals received at its control input. Those skilled in the art will recognize that the functional unit 194 may be a multiply-accumulate unit, a threshold determination unit, an image rotation unit, an edge enhancement unit, or any type of functional unit suitable for performing pipelined operations upon partitioned data. The data selector 190 routes data from the output of the DOU cross-bar switch 150 into a given flip-flop array 192 according to the RF addresses received at its control input. Each flip-flop array 192 preferably includes a set of sequentially-coupled data latches for spatially and temporally aligning data relative to the data contents of another flip-flop array 192, under the direction of the control signals received at its control input. The DOU cross-bar switch 150 selectively routes: 1) data from the memory 34 to the data selector 190; 2) results from the multiply/accumulate unit 194 to the data selector 190 or the memory 34; and 3) constants from the IFU 60 to the data selector 190. Those skilled in the art will recognize that an inner-loop ISA may have a set of "built-in" constants. In the implementation of such an inner-loop ISA, the store/align logic 154 preferably includes a CLB-based ROM containing the built-in constants, thereby eliminating the need to route constants from the IFU 60 into the store/align logic 152 via the DOU cross-bar switch 150. In the preferred embodiment, the functional unit 194 is preferably implemented using logic function generators and circuitry dedicated to mathematical operations within a set of CLBs. Each flip-flop array 192 is preferably implemented using flip-flops within a set of CLBs, and the data selector 190 is preferably implemented using logic function generators and data selection circuitry within a set of CLBs. Finally, the DOU cross-bar switch 150 is preferably implemented in the manner previously described for an inner-loop ISA.

Figure 10:
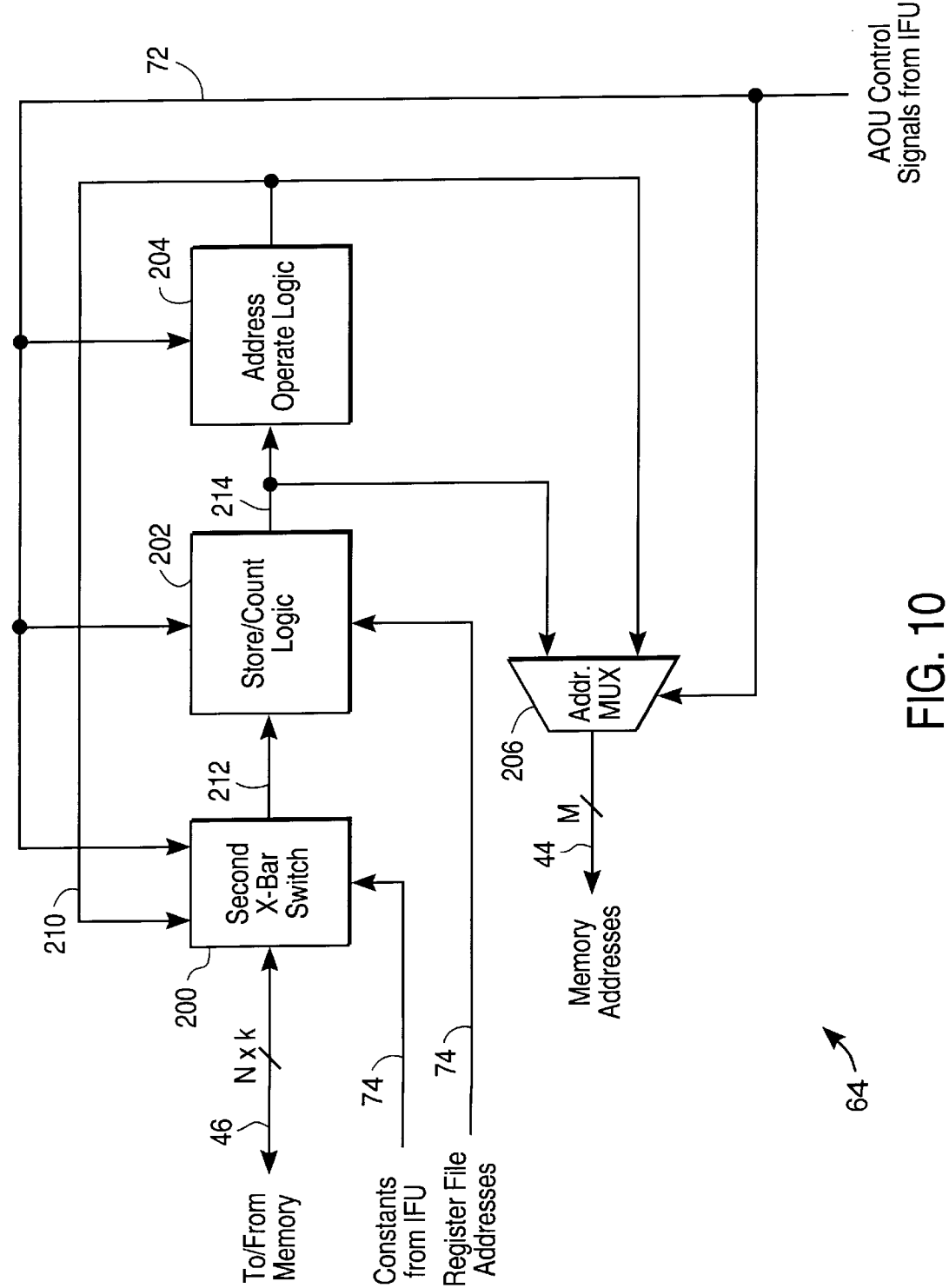
FIG. 10 is a block diagram of a preferred embodiment of an Address Operate Unit of the present invention.

Referring now to FIG. 10, a block diagram of a preferred embodiment of the Address Operate Unit 64 is shown. The AOU 64 performs operations upon addresses according to AOU control signals, RF addresses, and constants received from the IFU 60. The AOU 64 comprises a AOU cross-bar switch 200, store/count logic 202, address operate logic 204, and an address multiplexor 206. Each of the AOU cross-bar switch 200, the store/count logic 202, the address operate logic 204, and the address multiplexor 206 has a control input coupled to the second control output of the IFU 60 via the second control line 72. The AOU cross-bar switch 200 has a bidirectional data port that forms the AOU's bidirectional data port; an address feedback input coupled to an address output of the address operate logic 204 via a first address line 210; a constants input coupled to the third control line 74; and an address output coupled to an address input of the store/count logic 202 via a second address line 212. In addition to its address input and control input, the store/count logic 202 has an RF address input coupled to the third control line 74, and an address output coupled to an address input of the address operate logic 204 via a third address line 214. The address multiplexor 206 has a first input coupled to the first address line 210, a second input coupled to the third address line 214, and an output that forms the address output of the AOU 64.

The address operate logic 204 performs arithmetic operations upon addresses received at its address input under the direction of AOU control signals received at its control input. The store/count logic 202 provides temporary storage of addresses and address computation results. The AOU cross-bar switch 200 facilitates the loading of addresses from the memory 34, the transfer of results output by the address operate logic 204 to the store/count logic 202 or the memory 34, and the loading of constants output by the IFU 60 into the store/count logic 202 in accordance with the AOU control signals received at its control input. The address multiplexor 206 selectively outputs an address received from the store/count logic 202 or the address operate logic 200 to the address output of the AOU 64 under the direction of the AOU control signals received at its control input. In the preferred embodiment, the detailed structure of the AOU cross-bar switch 200, the store/align logic 202, and the address operate unit 204 is dependent upon the type of ISA currently under consideration, as is described hereafter with reference to FIGS. 11A and 11B.

Figure 11A:
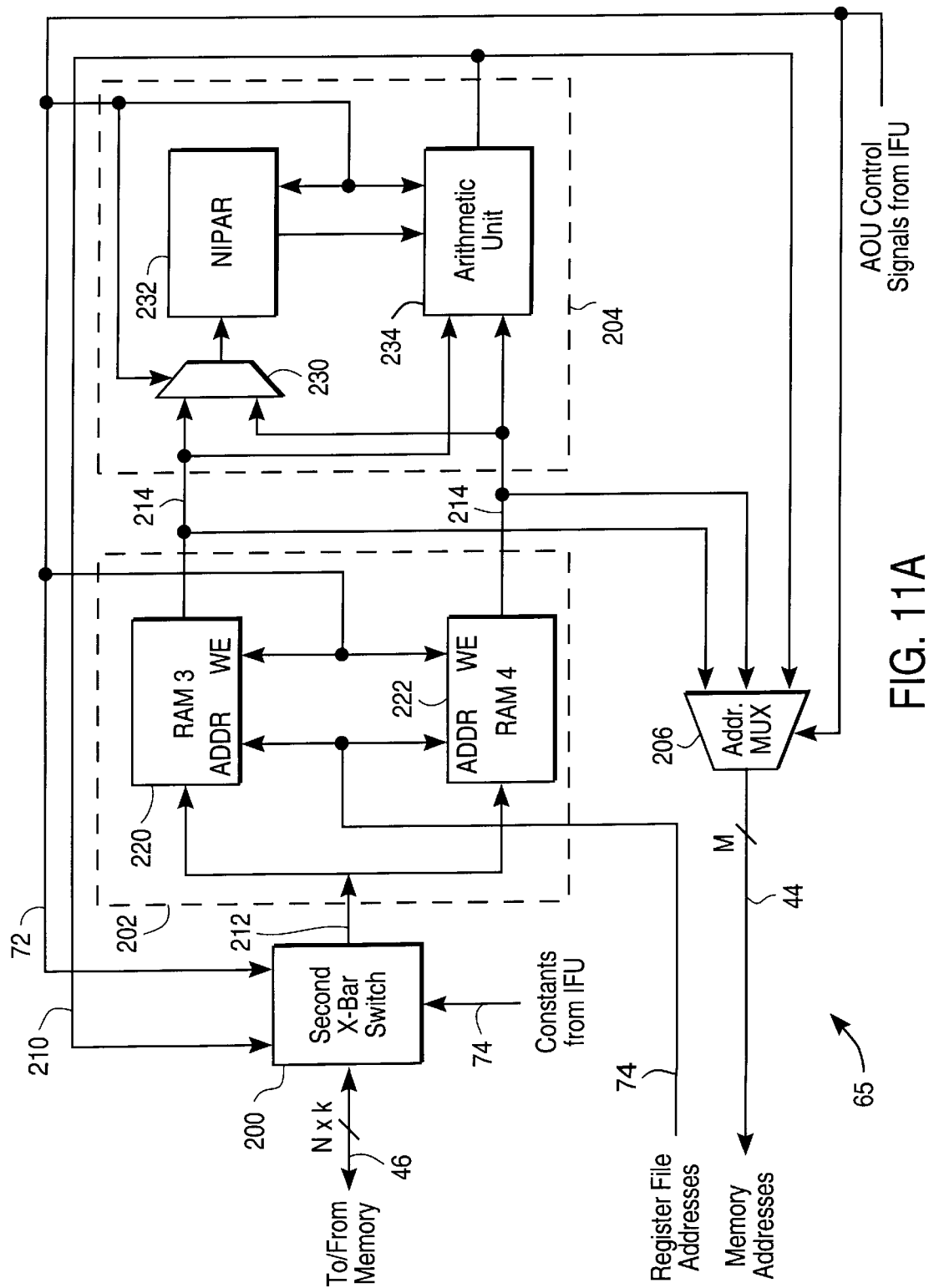
FIG. 11A is a block diagram of a first exemplary embodiment of the Address Operate Unit configured for the implementation of a general-purpose outer-loop Instruction Set Architecture.

Referring now to FIG. 11A, a block diagram of a first exemplary embodiment of the AOU 65 configured for the implementation of a general-purpose outer-loop ISA is shown. A general-purpose outer-loop ISA requires hardware for performing operations such as addition, subtraction, increment, and decrement upon the contents of a program counter and addresses stored in the store/count logic 202. In the first exemplary embodiment of the AOU 65, the address operate logic 204 preferably comprises a Next Instruction Program Address Register (NIPAR) 232 having an input, an output, and a control input; an arithmetic unit 234 having a first input, a second input, a third input, a control input, and an output; and a multiplexor 230 having a first input, a second input, a control input, and an output. The store/count logic 202 preferably comprises a third RAM 220 and a fourth RAM 222, each of which has an input, an output, an address-select input, and an enable input. The address multiplexor 206 preferably comprises a multiplexor having a first input, a second input, a third input, a control input, and an output. The AOU cross-bar switch 200 preferably comprises a conventional cross-bar switch network having duplex unidirectional crossbar couplings, and having the inputs and outputs previously described with reference to FIG. 10. An efficient implementation of the AOU cross-bar switch 200 may include multiplexors, tri-state buffers, CLB-based logic, direct wiring, or any subset of such elements joined by reconfigurable couplings. For an outer-loop ISA, the AOU cross-bar switch 200 is preferably implemented to maximize serial address movement in a minimum amount of time, while also providing a maximum number of unique address movement cross-bar couplings to support generalized outer-loop ISA address operate instructions.

The input of the third RAM 220 and the input of the fourth RAM 222 are each coupled to the output of the AOU cross-bar switch 200 via the second address line 212. The address-select inputs of the third and fourth RAM 220, 222 are coupled to receive RF addresses from the IFU 60 via the third control line 74, and the enable inputs of the first and second RAM 220, 222 are coupled to receive AOU control signals via the second control line 72. The output of the third RAM 220 is coupled to the first input of the multiplexor 230, the first input of the arithmetic unit 234, and the first input of the address multiplexor 206. Similarly, the output of the fourth RAM 222 is coupled to the second input of the multiplexor 230, the second input of the arithmetic unit 234, and the second input of the address multiplexor 206. The control inputs of the multiplexor 230, the NIPAR 232, and the arithmetic unit 234 are each coupled to the second control line 72. The output of the arithmetic unit 234 forms the output of the address operate logic 204, and is therefore coupled to the address feedback input of the AOU cross-bar, switch 200 and the third input of the address multiplexor 206. The couplings to the remaining inputs and outputs of the AOU cross-bar switch 200 and the address multiplexor 206 are identical to those previously described with reference to FIG. 10.

To facilitate the execution of an address-operate instruction, the IFU 60 issues AOU control signals, RF addresses, and constants to the AOU 64 during either of ISS states E or M. The third and fourth RAM 220, 222 provide a first and a second register file for temporary address storage, respectively. Individual storage locations within the third and fourth RAM 220, 222 are selected according to the RF addresses received at each RAM's respectively address-select input. The loading of the third and fourth RAM 220, 222 is controlled by the AOU control signals each respective RAM 220, 222 receives at its write-enable input. The multiplexor 230 selectively routes addresses output by the third and fourth RAM 220, 222 to the NIPAR 232 under the direction of the AOU control signals received at its control input. The NIPAR 232 loads an address received from the output of the multiplexor 230 and increments its contents in response to the AOU control signals received at its control input. In the preferred embodiment, the NIPAR 232 stores the address of the next program instruction to be executed. The arithmetic unit 234 performs arithmetic operations including addition, subtraction, increment, and decrement upon addresses received from the third and fourth RAM 220, 222 and/or upon the contents of the NIPAR 232. The AOU cross-bar switch 200 selectively routes: 1) addresses from the memory 34 to the third and fourth RAM 220, 222; and 2) results of address computations output by the arithmetic unit 234 to the memory 34 or the third and fourth RAM 220, 222. The AOU cross-bar switch 200 performs a particular routing operation according to the AOU control signals received at its control input. The address multiplexor 206 selectively routes addresses output by the third RAM 220, addresses output by the fourth RAM 222, or the results of address computations output by the arithmetic unit 234 to the AOU's address output under the direction of the AOU control signals received at its control input.

In the preferred embodiment, the third and fourth RAM 220, 222 are each implemented using the data storage circuitry present within a set of CLBs. The multiplexor 230 and the address multiplexor 206 are each preferably implemented using data selection circuitry present within a set of CLBs, and the NIPAR 232 is preferably implemented using data storage circuitry present within a set of CLBs. The arithmetic unit 234 is preferably implemented using logic function generators and circuitry dedicated to mathematical operations within a set of CLBs. Finally, the AOU cross-bar switch 200 is preferably implemented in the manner previously described.

Figure 11B:
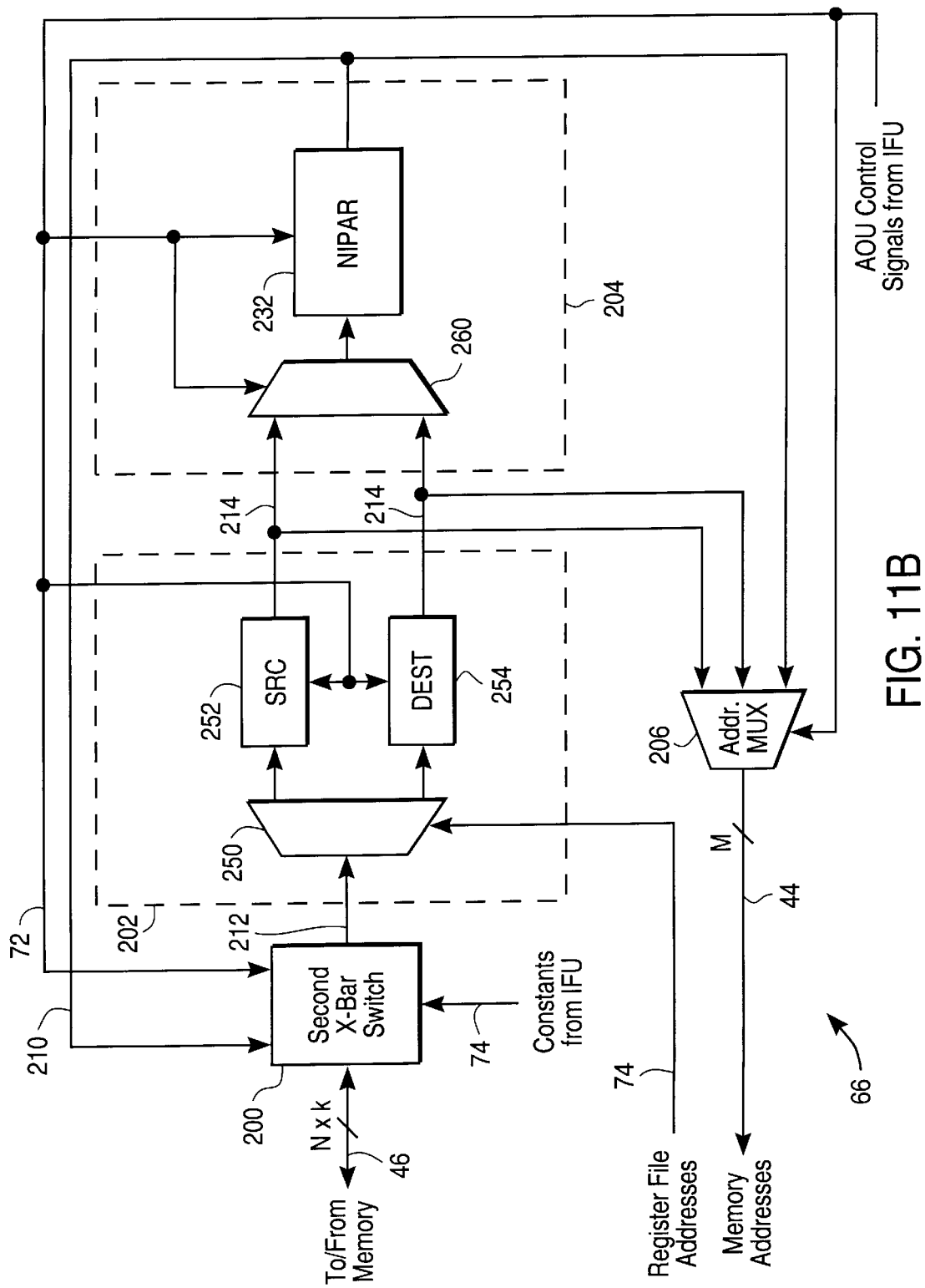
FIG. 11B is a block diagram of a second exemplary embodiment of the Address Operate Unit configured for the implementation of an inner-loop Instruction Set Architecture.

Referring now to FIG. 11B, a block diagram of a second exemplary embodiment of the AOU 66 configured for the implementation of an inner-loop ISA is shown. Preferably, an inner-loop ISA requires hardware for performing a very limited set of address operations, and hardware for maintaining at least one source address pointer and a corresponding number of destination address pointers. Types of inner-loop processing for which a very limited number of address operations or even a single address operation are required include block, raster, or serpentine operations upon image data; bit reversal operations; operations upon circular buffer data; and variable length data parsing operations. Herein, a single address operation is considered, namely, an increment operation. Those skilled in the art will recognize that hardware that performs increment operations may also be inherently capable of performing decrement operations, thereby providing an additional address operation capability. In the second exemplary embodiment of the AOU 66, the store/count logic 202 comprises at least one source address register 252 having an input, an output, and a control input; at least one destination address register 254 having an input, an output, and a control input; and a data selector 250 having an input, a control input, and a number of outputs equal to the total number of source and destination address registers 252, 254 present. Herein, a single source address register 252 and a single destination address register 254 are considered, and hence the data selector 250 has a first output and a second output. The address operate logic 204 comprises a NIPAR 232 having an input, an output, and a control output; and a multiplexor 260 having a number of inputs equal to the number of data selector outputs, a control input, and an output. Herein, the multiplexor 260 has a first input and a second input. The address multiplexor 206 preferably comprises a multiplexor having a number of inputs one greater than the number of data selector outputs, a control input, and an output. Thus, herein the address multiplexor 206 has a first input, a second input, and a third input. The AOU cross-bar switch 200 preferably comprises a conventional cross-bar switch network having bidirectional and unidirectional crossbar couplings, and having the inputs and outputs previously described with reference to FIG. 10. An efficient implementation of the AOU cross-bar switch 200 may include multiplexors, tri-state buffers, CLB-based logic, direct wiring, or any subset of such elements joined by reconfigurable couplings. For an inner-loop ISA, the AOU cross-bar switch 200 is preferably implemented to maximize parallel address movement in a minimum possible time, while also providing a minimum number of unique address movement cross-bar couplings to support inner-loop address operations.

The input of the data selector 250 is coupled to the output of the AOU cross-bar switch 200. The first and second outputs of the data selector 250 are coupled to the input of the source address register 252 and the input of the destination address register 254, respectively. The control inputs of the source address register 252 and the destination address register 254 are coupled to receive AOU control signals via the second control line 72. The output of the source address register 252 is coupled to the first input of the multiplexor 260 and the first input of the address multiplexor 206. Similarly, the output of the destination register 254 is coupled to the second input of the multiplexor 254 and the second input of the address multiplexor 206. The input of the NIPAR 232 is coupled to the output of the multiplexor 260, the control input of the NIPAR 232 is coupled to receive AOU control signals via the second control line 72, and the output of the NIPAR 232 is coupled to both the address feedback input of the AOU cross-bar switch 200 and the third input of the address multiplexor 206. The couplings to the remaining inputs and outputs of the AOU cross-bar switch 200 are identical to those previously described above with reference to FIG. 10.

In operation, the data selector 250 routes addresses received from the AOU cross-bar switch to the source address register 252 or the destination address register 254 according to the RF addresses received at its control input. The source address register 252 loads an address present at its input in response to the AOU control signals present at its control input. The destination address 254 register loads an address present at its input in an analogous manner. The multiplexor 260 routes an address received from the source address register 252 or the destination address register 254 to the input of the NIPAR 232 according to the AOU control signals received at its control input. The NIPAR 232 loads an address present at its input, increments its contents, or decrements its contents in response to the AOU control signals received at its control input. The AOU cross-bar switch 200 selectively routes: 1) addresses from the memory 34 to the data selector 250; and 2) the contents of the NIPAR 232 to the memory 34 or the data selector 250. The AOU cross-bar switch 200 performs a particular routing operation according to the AOU control signals received at its control input. The address multiplexor 206 selectively routes the contents of the source address register 252, the destination address register 254, or the NIPAR 232 to the AOU's address output under the direction of the AOU control signals received at its control input.

In the preferred embodiment, the source address register 252 and the destination address register 254 are each implemented using the data storage circuitry present within a set of CLBs. The NIPAR 232 is preferably implemented using increment/decrement logic and flip-flops within a set of CLBs. The data selector 250, the multiplexor 230, and the address multiplexor 206 are each preferably implemented using data selection circuitry present within a set of CLBs. Finally, the AOU cross-bar switch 200 is preferably implemented in the manner previously described for an inner-loop ISA. Those skilled in the art will recognize that in certain applications, it may be advantageous to utilize an ISA that relies upon an inner-loop AOU configuration with an outer-loop DOU configuration, or vice-versa. For example, an associative string search ISA would beneficially utilize an inner-loop DOU configuration with an outer-loop AOU configuration. As another example, an ISA for performing histogram operations would beneficially utilize an outer-loop DOU configuration with an inner-loop AOU configuration.

Finite reconfigurable hardware resources must be allocated between each element of the DRPU 32. Because the reconfigurable hardware resources are limited in number, the manner in which they are allocated to the IFU 60, for example, affects the maximum computational performance level achievable by the DOU 62 and the AOU 64. The manner in which the reconfigurable hardware resources are allocated between the IFU 60, the DOU 62, and the AOU 64 varies according to the type of ISA to be implemented at any given moment. As ISA complexity increases, more reconfigurable hardware resources must be allocated to the IFU 60 to facilitate increasingly complex decoding and control operations, leaving fewer reconfigurable hardware resources available between the DOU 62 and the AOU 64. Thus, the maximum computational performance achievable from the DOU 62 and the AOU 64 decreases with ISA complexity. In general, an outer-loop ISA will have many more instructions than an inner-loop ISA, and therefore its implementation will be significantly more complex in terms of decoding and control circuitry. For example, an outer-loop ISA defining a general-purpose 64-bit processor would have many more instructions than an inner-loop ISA that is dedicated solely to data compression.

Figure 12A:
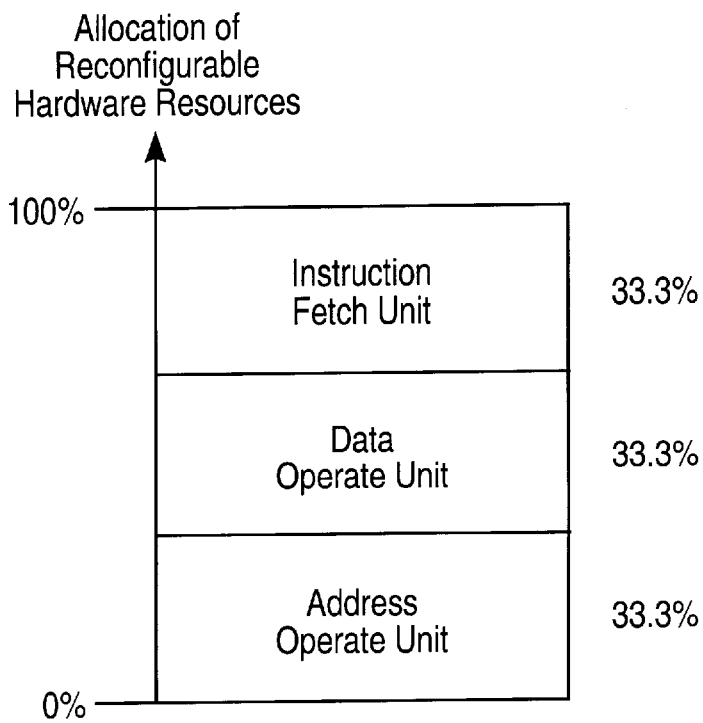
FIG. 12A is a diagram showing an exemplary allocation of reconfigurable hardware resources between the Instruction Fetch Unit, the Data Operate Unit, and the Address Operate Unit for an outer-loop Instruction Set Architecture.
Figure 12B:
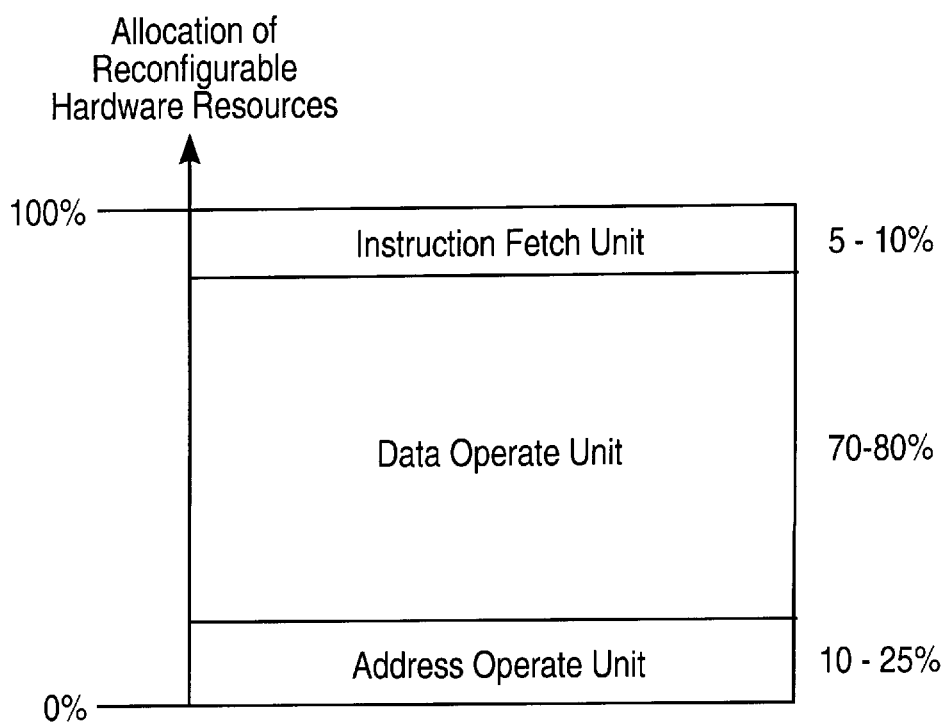
FIG. 12B is a diagram showing an exemplary allocation of reconfigurable hardware resources between the Instruction Fetch Unit, the Data Operate Unit, and the Address Operate Unit for an inner-loop Instruction Set Architecture.

Referring now to FIG. 12A, a diagram showing an exemplary allocation of reconfigurable hardware resources between the IFU 60, the DOU 62, and the AOU 64 for an outer-loop ISA is shown. In the exemplary allocation of reconfigurable hardware resources for the outer-loop ISA, the IFU 60, the DOU 62, and the AOU 64 are each allocated approximately one-third of the available reconfigurable hardware resources. In the event that the DRPU 32 is to be reconfigured to implement an inner-loop ISA, fewer reconfigurable hardware resources are required to implement the IFU 60 and the AOU 64 due to the limited number of instructions and types of address operations supported by an inner-loop ISA. Referring also now to FIG. 12B, a diagram showing an exemplary allocation of reconfigurable hardware resources between the IFU 60, the DOU 62, and the AOU 64 for an inner-loop ISA is shown. In the exemplary allocation of reconfigurable hardware resources for the inner-loop ISA, the IFU 60 is implemented using approximately 5 to 10 percent of the reconfigurable hardware resources, and the AOU 64 is implemented using approximately 10 to 25 percent of the reconfigurable hardware resources. Thus, approximately 70 to 80 percent of the reconfigurable hardware resources remain available for implementing the DOU 62. This in turn means that the internal structure of the DOU 62 associated with the inner-loop ISA can be more complex and therefore offer significantly higher performance than the internal structure of the DOU 62 associated with the outer-loop ISA.

Those skilled in the art will recognize that the DRPU 32 may exclude either the DOU 62 or the AOU 64 in an alternate embodiment. For example, in an alternate embodiment the DRPU 32 may not include an AOU 64. The DOU 652 would then be responsible for performing operations upon both data and addresses. Regardless of the particular DRPU embodiment considered, a finite number of reconfigurable hardware resources must be allocated to implement the elements of the DRPU 32. The reconfigurable hardware resources are preferably allocated such that optimum or near-optimum performance is achieved for the currently-considered ISA relative to the total space of available reconfigurable hardware resources.

Those skilled in the art will recognize that the detailed structure of each element of the IFU 60, the DOU 62, and the AOU 64 is not limited to the embodiments described above. For a given ISA, the corresponding configuration data set is preferably defined such that the internal structure of each element within the IFU 60, the DOU 62, and the AOU 64 maximizes computational performance relative to the available reconfigurable hardware resources.

Figure 13:
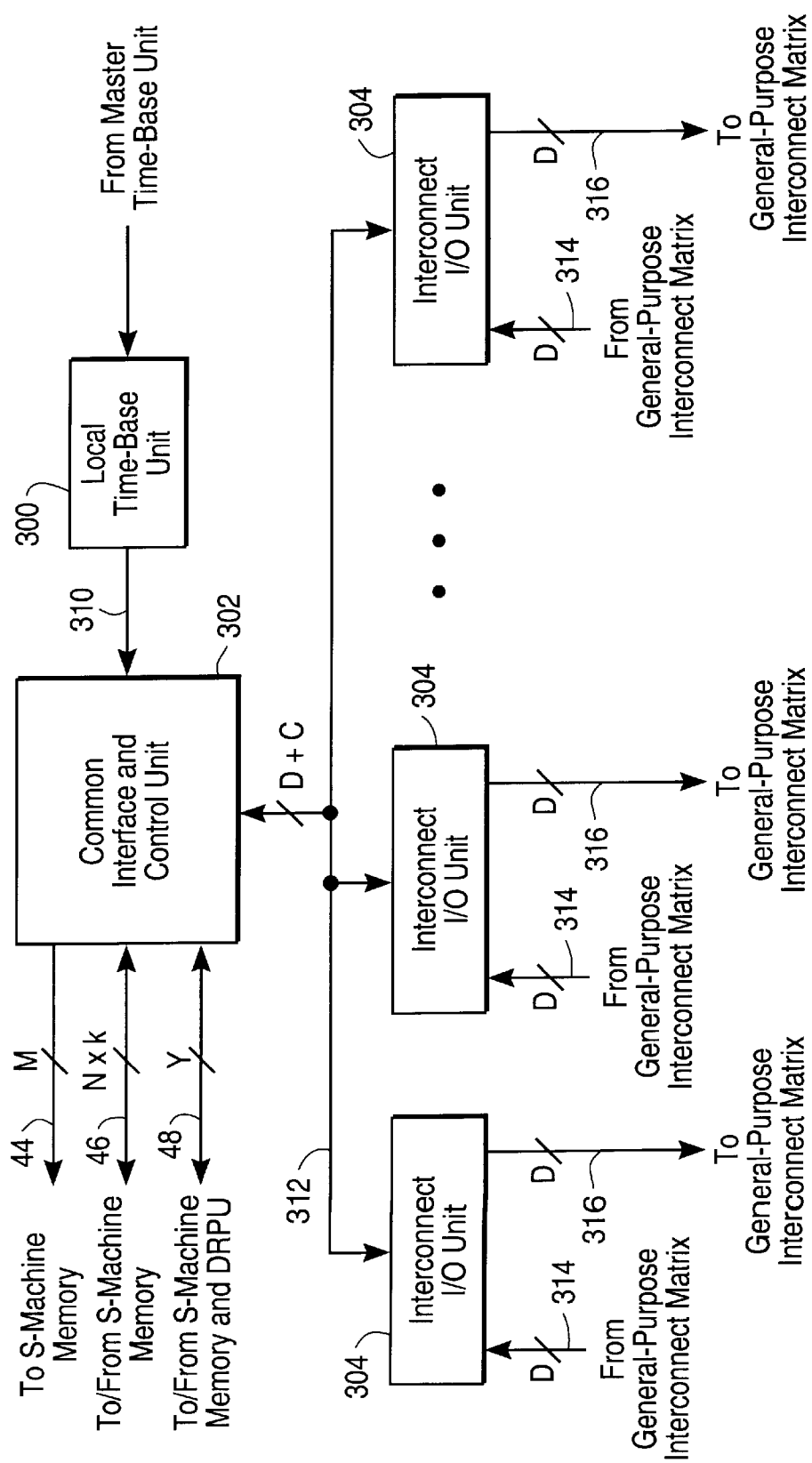
FIG. 13 is a block diagram of a preferred embodiment of a T-machine of the present invention.

Referring now to FIG. 13, a block diagram of a preferred embodiment of a T-machine 14 is shown. The T-machine 14 comprises a second local time-base unit 300, a common interface and control unit 302, and a set of interconnect I/O units 304. The second local time-base unit 300 has a timing input that forms the T-machine's master timing input. The common interface and control unit 302 has a timing input coupled to a timing output of the second local time-base unit 300 via a second timing signal line 310, an address output coupled to the address line 44, a first bidirectional data port coupled to the memory I/O line 46, a bidirectional control port coupled to the external control line 48, and a second bidirectional data port coupled to a bidirectional data port of each interconnect I/O unit 304 present via a message transfer line 312. Each interconnect I/O unit 304 has an input coupled to the GPIM 16 via a message input line 314, and an output coupled to the GPIM 16 via a message output line 316.

The second local time-base unit 300 within the T-machine 14 receives the master timing signal from the master time-base unit 22, and generates a second local timing signal. The second local time-base unit 300 delivers the second local timing signal to the common interface and control unit 302, thereby providing a timing reference for the T-machine 14 in which it resides. Preferably, the second local timing signal is phase-synchronized with the master timing signal. Within the system 10, each T-machine's second local time-base unit 300 preferably operates at an identical frequency. Those skilled in the art will recognize that in an alternate embodiment, one or more second local time-base units 300 could operate at different frequencies. The second local time-base unit 300 is preferably implemented using conventional phase-locked frequency-conversion circuitry, including CLB-based phase-lock detection circuitry. Those skilled in the art will recognize that in an alternate embodiment, the second local time-base unit 300 could be implemented as a portion of a clock distribution tree.

The common interface and control unit 302 directs the transfer of messages between its corresponding S-machine 12 and a specified interconnect I/O unit 304, where a message includes a command and possibly data. In the preferred embodiment, the specified interconnect I/O unit 304 may reside within any T-machine 14 or I/O T-machine 18 internal or external to the system 10. In the present invention, each interconnect I/O unit 304 is preferably assigned an interconnect address that uniquely identifies the interconnect I/O unit 304. The interconnect addresses for the interconnect I/O units 304 within a given T-machine are stored in the corresponding S-machine's architecture description memory 101.

The common interface and control unit 302 receives data and commands from its corresponding S-machine 12 via the memory I/O line 46 and the external control signal line 48, respectively. Preferably, each command received includes a target interconnect address and a command code that specifies a particular type of operation to be performed. In the preferred embodiment, the types of operations uniquely identified by command codes include: 1) data read operations; 2) data write operations; and 3) interrupt signal transfer, including reconfiguration interrupt transfer. The target interconnect address identifies a target interconnect I/O unit 304 to which data and commands are to be transferred. Preferably, the common interface and control unit 302 transfers each command and any related data as a set of packet-based messages in a conventional manner, where each message includes the target interconnect address and the command code.

In addition to receiving data and commands from its corresponding S-machine 12, the common interface and control unit 302 receives messages from each of the interconnect I/O units 304 coupled to the message transfer line 312. In the preferred embodiment, the common interface and control unit 302 converts a group of related messages into a single command and data sequence. If the command is directed to the DRPU 32 within its corresponding S-machine 12, the common interface and control unit 302 issues the command via the external control signal line 48. If the command is directed to the memory 34 within its corresponding S-machine 12, the common interface and control unit 302 issues an appropriate memory control signal via the external control signal line 48 and a memory address signal via the memory address line 44. Data is transferred via the memory I/O line 46. In the preferred embodiment, the common interface and control unit 302 comprises CLB-based circuitry to implement operations analogous to those performed by a conventional SCI switching unit as defined by ANSI/IEEE Standard 1596–1992.

Figure 14:
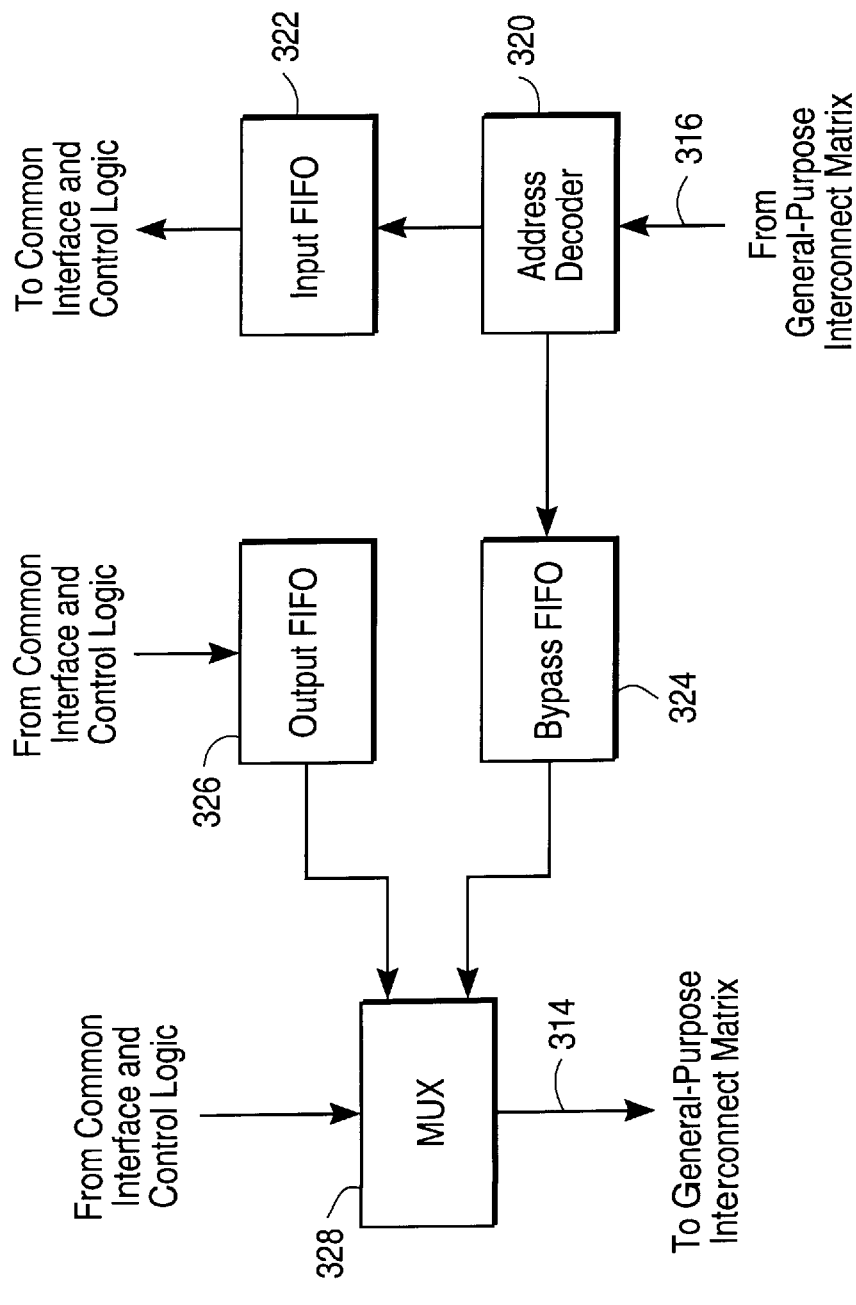
FIG. 14 is a block diagram of an interconnect I/O unit of the present invention.

Each interconnect I/O unit 304 receives messages from the common interface and control unit 302, and transfers messages to other interconnect I/O units 304 via the GPIM 16, under direction of control signals received from the common interface and control unit 302. In the preferred embodiment, the interconnect I/O unit 304 is based upon an SCI node as defined by ANSI/IEEE Standard 1596–1992. Referring now to FIG. 14, a block diagram of a preferred embodiment of an interconnect I/O unit 304 is shown. The interconnect I/O unit 304 comprises an address decoder 320, an input FIFO buffer 322, a bypass FIFO buffer 324, an output FIFO buffer 326, and a multiplexor 328. The address decoder 320 has an input that forms the interconnect I/O unit's input, a first output coupled to the input FIFO 322, and a second output coupled to the bypass FIFO 324. The input FIFO 322 has an output coupled to the message transfer line 312 for transferring messages to the common interface and control unit 302. The output FIFO 326 has an input coupled to the message transfer line 312 for receiving messages from the common interface and control unit 302, and an output coupled to a first input of the multiplexor 328. The bypass FIFO 326 has an output coupled to a second input of the multiplexor 328. Finally, the multiplexor 328 has a control input coupled to the message transfer line 312, and an output that forms the interconnect I/O unit's output.

The interconnect I/O unit 304 receives messages at the input of the address decoder 320. The address decoder 320 determines whether the target interconnect address specified in a received message is identical to the interconnect address of the interconnect I/O unit 304 in which it resides. If so, the address decoder 320 routes the message to the input FIFO 322. Otherwise, the address decoder 320 routes the message to the bypass FIFO 324. In the preferred embodiment, the address decoder 320 comprises a decoder and a data selector implemented using IOBs and CLBs.

The input FIFO 322 is a conventional FIFO buffer that transfers messages received at its input to the message transfer line 312. Both the bypass FIFO 324 and the output FIFO 326 are conventional FIFO buffers that transfer messages received at their inputs to the multiplexor 328. The multiplexor 328 is a conventional multiplexor that routes either a message received from the bypass FIFO 324 or a message received from the output FIFO 326 to the GPIM 16 in accordance with a control signal received at its control input. In the preferred embodiment, each of the input FIFO 322, the bypass FIFO 324, and the output FIFO 326 are implemented using a set of CLBs. The multiplexor 328 is preferably implemented using a set of CLBs and IOBs.

Figure 15:
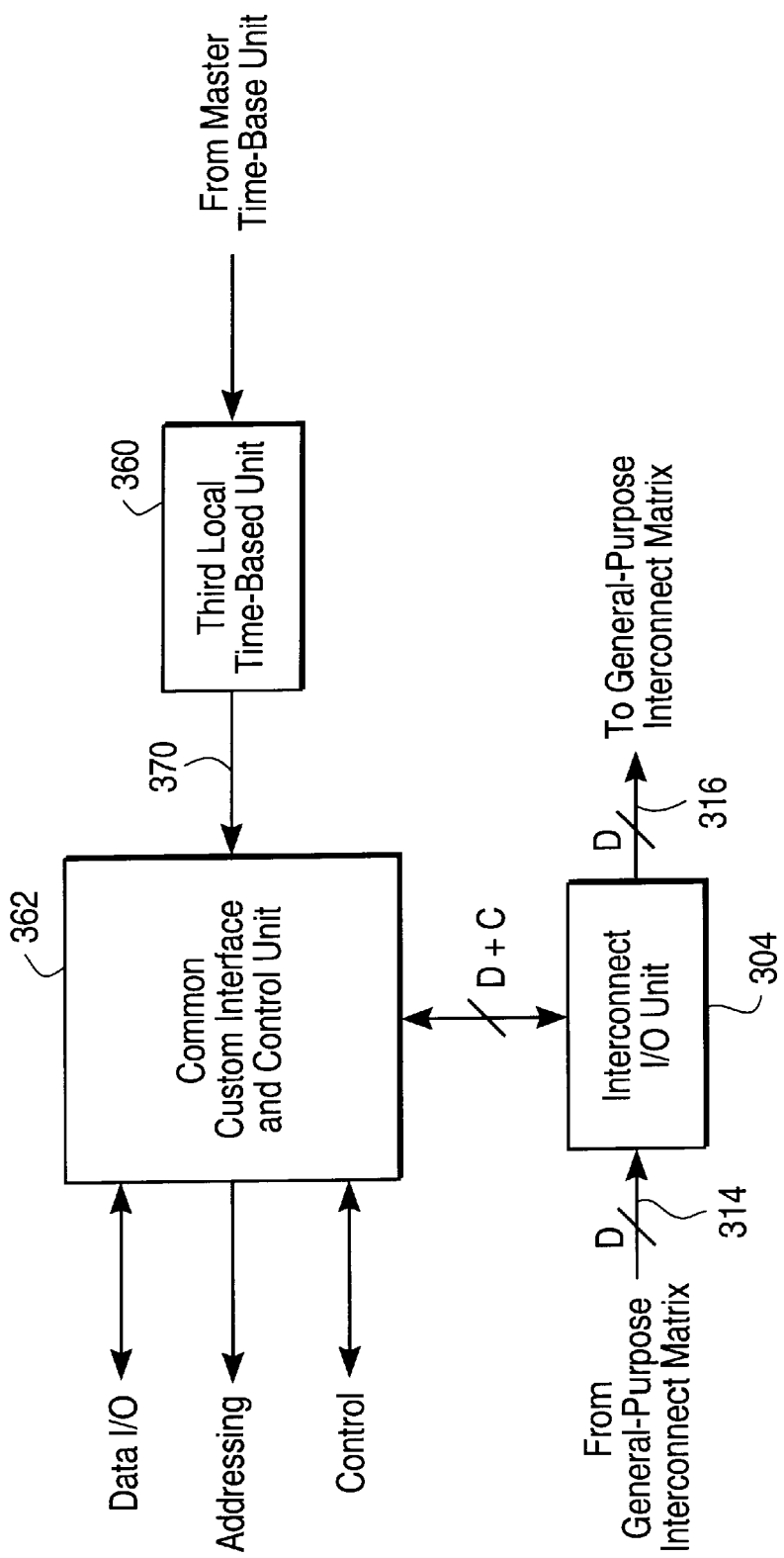
FIG. 15 is a block diagram of a preferred embodiment of an I/O T-machine of the present invention.

Referring now to FIG. 15, a block diagram of a preferred embodiment of an I/O T-machine 18 is shown. The I/O T-machine 18 comprises a third local time-base unit 360, a common custom interface and control unit 362, and an interconnect I/O unit 304. The third local time-base unit 360 has a timing input that forms the I/O T-machine's master timing input. The interconnect I/O unit 304 has an input coupled to the GPIM 16 via a message input line 314, and an output coupled to the GPIM 16 via a message output line 316. The common custom interface and control unit 362 preferably has a timing input coupled to a timing output of the third local time-base unit 360 via a third timing signal line 370, a first bidirectional data port coupled to a bidirectional data port of the interconnect I/O unit 304, and a set of couplings to an I/O device 20. In the preferred embodiment, the set of couplings to the I/O device 20 includes a second bidirectional data port coupled to a bidirectional data port of the I/O device 20, an address output coupled to an address input of the I/O device 20, and a bidirectional control port coupled to a bidirectional control port of the I/O device 20. Those skilled in the art will readily recognize that the couplings to the I/O device 20 are dependent upon the type of I/O device 20 to which the common custom interface and control unit 362 is coupled.

The third local time-base unit 360 receives the master timing signal from the master time-base unit 22, and generates a third local timing signal. The third local time-base unit 360 delivers the third local timing signal to the common custom interface and control unit 362, thus providing a timing reference for the I/O T-machine in which it resides. In the preferred embodiment, the third local timing signal is phase-synchronized with the master timing signal. Each I/O T-machine's third local time-base unit 360 preferably operates at an identical frequency. In an alternate embodiment, one or more third local time-base unit 360 could operate at different frequencies. The third local time-base unit 360 is preferably implemented using conventional phase-locked frequency-conversion circuitry that includes CLB-based phase-lock detection circuitry. In a manner analogous to that for the first and second local time-base units 30, 300, the third local time-base unit 360 could be implemented as a portion of a clock distribution tree in an alternate embodiment.

The structure and functionality of the interconnect I/O unit 304 within the I/O T-machine 18 is preferably identical to that previously described for the T-machine 14. The interconnect I/O unit 304 within the I/O T-machine 18 is assigned a unique interconnect address in a manner analogous to that for each interconnect I/O unit 304 within any given T-machine 14.

The common custom interface and control unit 362 directs the transfer of messages between the I/O device 20 to which it is coupled and the interconnect I/O unit 304, where a message includes a command and possibly data. The common custom interface and control unit 362 receives data and commands from its corresponding I/O device 20. Preferably, each command received from the I/O device 20 includes a target interconnect address and a command code that specifies a particular type of operation to be performed. In the preferred embodiment, the types of operations uniquely identified by command codes include: 1) data requests; 2) data transfer acknowledgments; and 3) interrupt signal transfer. The target interconnect address identifies a target interconnect I/O unit 304 in the system 10 to which data and commands are to be transferred Preferably, the common interface and control unit 362 transfers each command and any related data as a set of packet-based messages in a conventional manner, where each message includes the target interconnect address and the command code.

In addition to receiving data and commands from its corresponding I/O device 20, the common custom interface and control unit 362 receives messages from its associated interconnect I/O unit 304. In the preferred embodiment, the common custom interface and control unit 362 converts a group of related messages into a single command and data sequence in accordance with the communication protocols supported by its corresponding I/O device 20. In the preferred embodiment, the common custom interface and control unit 362 comprises a CLB-based I/O device controller coupled to CLB-based circuitry for implementing operations analogous to those performed by a conventional SCI switching unit as defined by ANSI/IEEE Standard 1596–1992.

Figure 16:
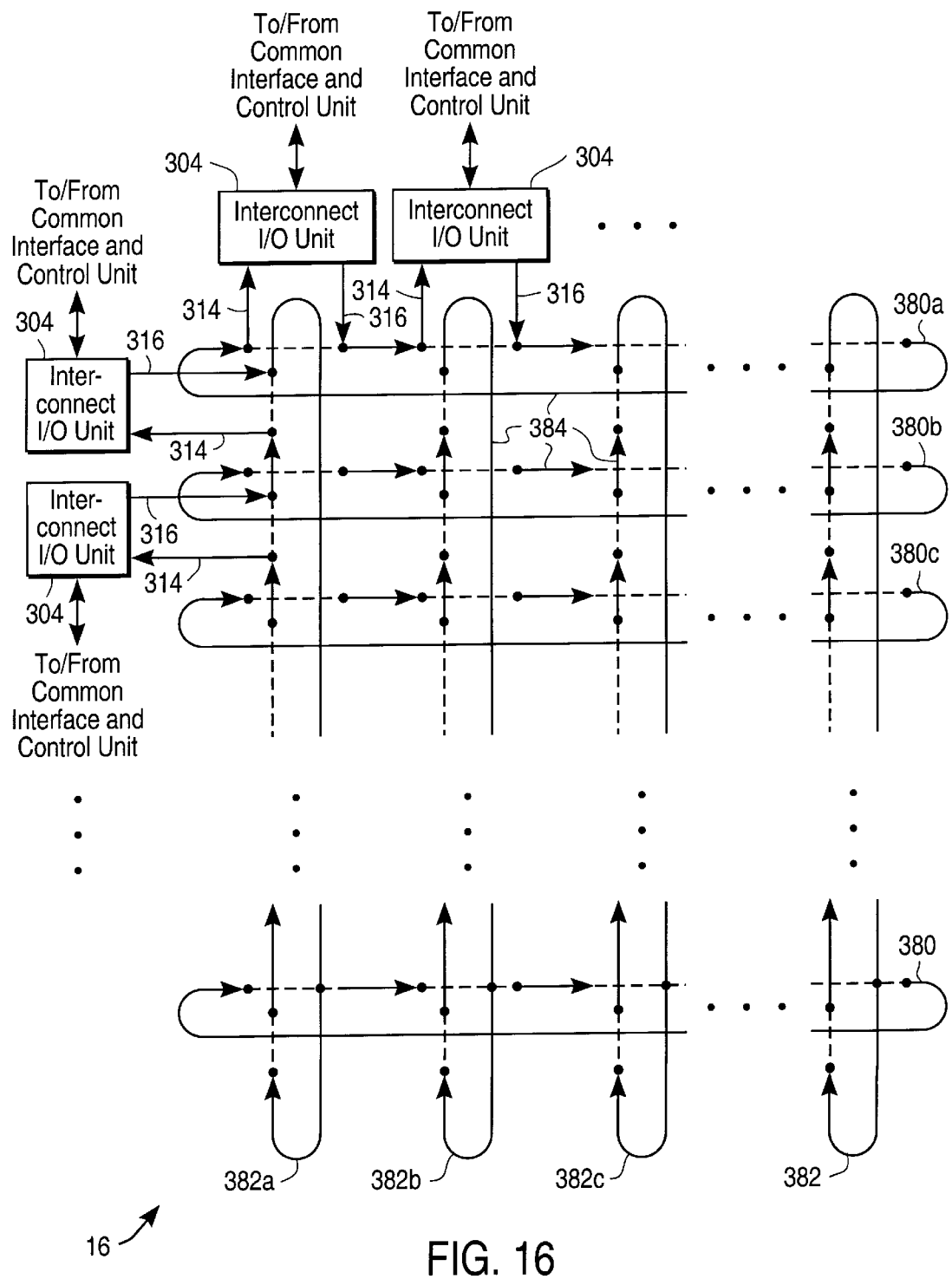
FIG. 16 is a block diagram of a preferred embodiment of a General Purpose Interconnect Matrix of the present invention.

The GPIM 16 is a conventional interconnect mesh that facilitates point-to-point parallel message routing between interconnect I/O units 304. In the preferred embodiment, the GPIM 16 is a wire-based k-ary n-cube static interconnect network. Referring now to FIG. 16, a block diagram of an exemplary embodiment of a General Purpose Interconnect Matrix 16 is shown. In FIG. 16, the GPIM 16 is a toroidal interconnect mesh, or equivalently, a k-ary 2-cube, comprising a plurality of first communication channels 380 and a plurality of second communication channels 382. Each first communication channel 380 includes a plurality of node connection sites 384, as does each second communication channel 382. Each interconnect I/O unit 304 in the system 10 is preferably coupled to the GPIM 16 such that the message input line 314 and the message output line 316 join consecutive node connection sites 384 within a given communication channel 380, 382. In the preferred embodiment, each T-machine 14 includes an interconnect I/O unit 304 coupled to the first communication channel 380 and an interconnect I/O unit 304 coupled to the second communication channel 382 in the manner described above. The common interface and control unit 302 within the T-machine 14 preferably facilitates the routing of information between its interconnect I/O unit 304 coupled to the first communication channel and its interconnect I/O unit 304 coupled to the second communication channel 382. Thus, for a T-machine 14 having an interconnect I/O unit 304 coupled to the first communication channel labeled as 380c and an interconnect I/O unit 304 coupled to the second communication channel labeled as 382c in FIG. 16, this T-machine's common interface and control unit 302 facilitates information routing between this set of first and second communication channels 380c, 382c.

The GPIM 16 thus facilitates the routing of multiple messages between interconnect I/O units 304 in parallel. For the two-dimensional GPIM 16 shown in FIG. 16, each T-machine 14 preferably includes a single interconnect I/O unit 304 for the first communication channel 380 and a single interconnect I/O unit 304 for the second communication channel 382. Those skilled in the art will recognize that in an embodiment in which the GPIM 16 has a dimensionality greater than two, the T-machine 14 preferably includes more than two interconnect I/O units 304. Preferably, the GPIM 16 is implemented as a k-ary 2-cube having a 16-bit datapath size.

In the preceding description, various elements of the present invention are preferably implemented using reconfigurable hardware resources. The manufacturers of reprogrammable logic devices typically provide published guidelines for implementing conventional digital hardware using reprogrammable or reconfigurable hardware resources. For example, the 1994 Xilinx Programmable Logic Data Book (Xilinx, Inc., San Jose, Calif.) includes Application Notes such as the following: Application Note XAPP 005.002, "Register-Based FIFO"; Application Note XAPP 044.00 "High-Performance RAM-Based FIFO"; Application Note XAPP 013.001, "Using the Dedicated Carry Logic in the XC4000"; Application Note XAPP 018.000, "Estimating the Performance of XC4000 Adders and Counters"; Application Note XAPP 028.001, "Frequency/Phase Comparator for PhaseLocked Loops"; Application Note XAPP 031.000, "Using the XC4000 RAM Capability"; Application Note XAPP 036.001, "Four-Port DRAM Controller . . . "; and Application Note XAPP 039.001, "18-Bit Pipelined Accumulator." Additional material published by Xilinx includes features in "XCELL, The Quarterly Journal for Xilinx Programmable Logic Users." For example, an article detailing the implementation of fast integer multipliers appears in Issue 14, the Third Quarter 1994 issue.

The system 10 described herein is a scalable, parallel computer architecture for dynamically implementing multiple ISAs. Any individual S-machine 12 is capable of running an entire computer program by itself, independent of another S-machine 12 or external hardware resources such as a host computer. On any individual S-machine 12, multiple ISAs are implemented sequentially in time during program execution in response to reconfiguration interrupts and/or program-embedded reconfiguration directives. Because the system 10 preferably includes multiple S-machines 12, multiple programs are preferably executed simultaneously, where each program may be independent. Thus, because the system 10 preferably includes multiple S-machines 12, multiple ISAs are implemented simultaneously (i.e., in parallel) at all times other than during system initialization or reconfiguration. That is, at any given time, multiple sets of program instructions are executed simultaneously, where each set of program instructions is executed according to a corresponding ISA. Each such ISA may be unique.

S-machines 12 communicate with each other and with I/O devices 20 via the set of T-machines 14, the GPIM 16, and each I/O T-machine 18. While each S-machine 12 is an entire computer in itself that is capable of independent operation, any S-machine 12 is capable of functioning as a master S-machine 12 for other S-machines 12 or the entire system 10, sending data and/or commands to other S-machines 12, one or more T-machines 16, one or more I/O T-machines 18, and one or more I/O devices 22.

The system 10 of the present invention is thus particularly useful for problems that can be divided both spatially and temporally into one or more data-parallel subproblems, for example: image processing, medical data processing, calibrated color matching, database computation, document processing, associative search engines, and network servers. For computational problems with a large array of operands, data parallelism exists when algorithms can be applied so as to offer an effective computational speed-up through parallel computing techniques. Data parallel problems possess known complexity, namely, $O(n^k)$. The value of k is problem-dependent; for example, k=2 for image processing, and k=3 for medical data processing. In the present invention, individual S-machines 12 are preferably utilized to exploit data parallelism at the level of program instruction groups. Because the system 10 includes multiple S-machines 12, the system 10 is preferably utilized to exploit data parallelism at the level of sets of entire programs.

The system 10 of the present invention provides a great deal of computational power because of its ability to completely reconfigure the instruction processing hardware in each S-machine 12 to optimize the computational capabilities of such hardware relative to computational needs at any given moment. Each S-machine 12 can be reconfigured independently of any other S-machine 12. The system 10 advantageously treats each configuration data set, and hence each ISA, as a programmed boundary or interface between software and the reconfigurable hardware described herein. The architecture of the present invention additionally facilitates the high-level structuring of reconfigurable hardware to selectively address the concerns of actual systems in situ, including: manners in which interruption affect instruction processing; the need for deterministic latency response to facilitate real-time processing and control capabilities; and the need for selectable responses to fault-handling.

In contrast with other computer architectures, the present invention teaches the maximal utilization of Silicon resources at all times. The present invention provides for a parallel computer system that can be increased to any desired size at any time, even to massively parallel sizes comprising thousands of S-machines 12. Such architectural scalability is possible because S-machine-based instruction processing is intentionally separated from T-machine-based data communication. This instruction processing/data communication separation paradigm is extremely well-suited for data-parallel computation. The internal structure of S-machine hardware is preferably optimized for time-flow of instructions, while the internal structure of T-machine hardware is preferably optimized for efficient data communication. The set of S-machines 12 and the set of T-machines are each a separable, configurable component in a space-time division of data-parallel computational labor.

With the present invention, future reconfigurable hardware may be exploited to construct systems having ever-greater computational capabilities while maintaining the overall structure described herein. In other words, the system 10 of the present invention is technologically scalable. Virtually all current reconfigurable logic devices are memory-based Complementary Metal-Oxide Semiconductor (CMOS) technology. Advances in device capacity follow semiconductor memory technology trends. In future systems, a reconfigurable logic device used to construct an S-machine 12 would have a division of internal hardware resources in accordance with the inner-loop and outer-loop ISA parametrics described herein. Larger reconfigurable logic devices simply offer the capability to perform more data parallel computational labor within a single device. For example, a larger functional unit 194 within the second exemplary embodiment of the DOU 63 as described above with reference to FIG. 9B would accommodate larger imaging kernel sizes. Those skilled in the art will recognize that the technological scalability provided by the present invention is not limited to CMOS-based devices, nor is it limited to FPGA-based implementations. Thus, the present invention provides technological scalability regardless of the particular technology used to provide reconfigurability or reprogrammability.

Figure 17A:
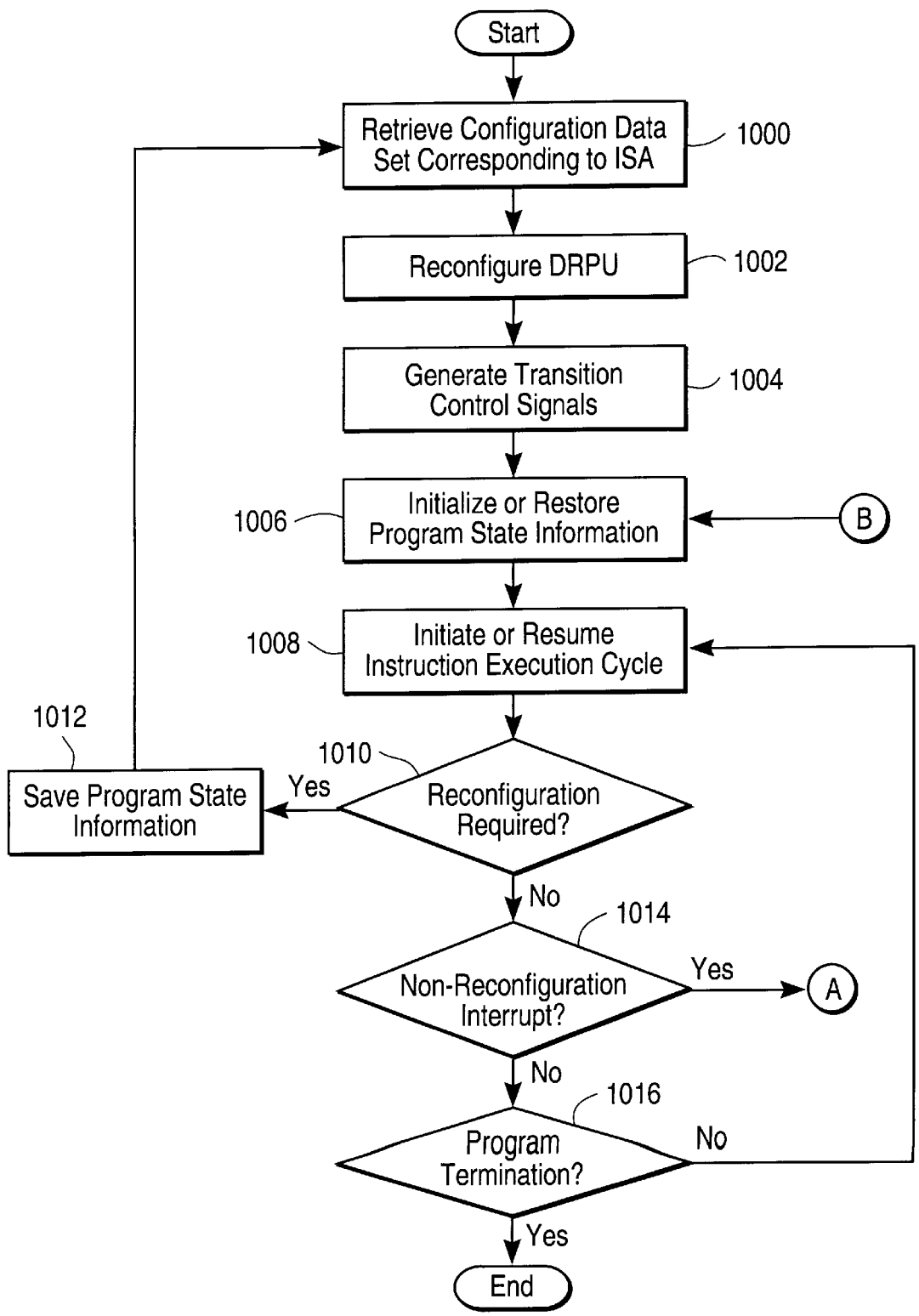
FIGS. 17A and 17B are a flowchart of a preferred method for scalable, parallel, dynamically reconfigurable computing in accordance with the present invention.
Figure 17B:
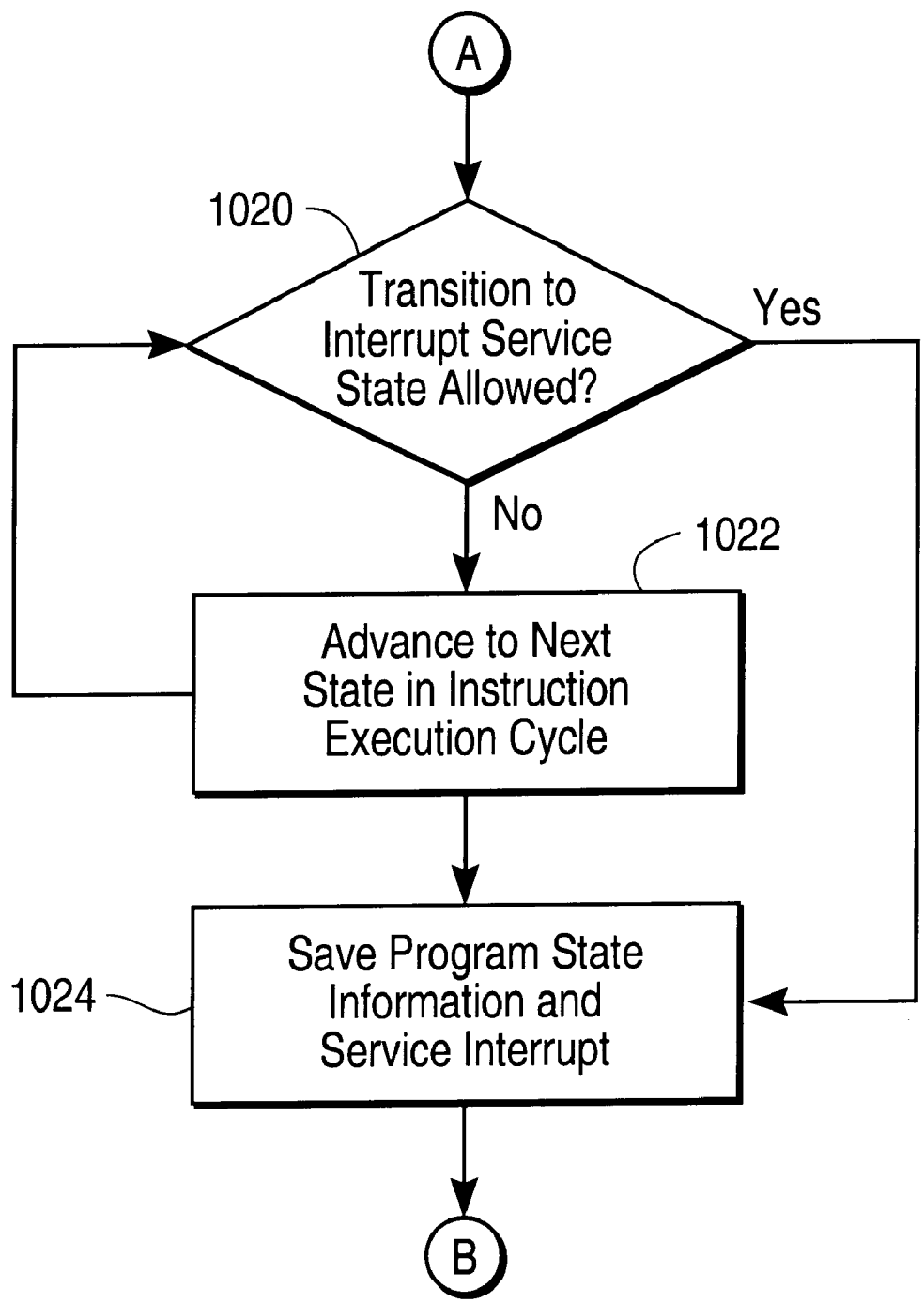

Referring now to FIGS. 17A and 17B, a flowchart of a preferred method for scalable, parallel, dynamically reconfigurable computing is shown. Preferably, the method of FIGS. 17A and 17B is performed within each S-machine 12 in the system 10. The preferred method begins in step 1000 of FIG. 17A with the reconfiguration logic 104 retrieving a configuration data set corresponding to an ISA. Next, in step 1002, the reconfiguration logic 104 configures each element within the IFU 60, the DOU 62, and the AOU 64 according to the retrieved configuration data set in step 1002, thereby producing a DRPU hardware organization for the implementation of the ISA currently under consideration. Following step 1002, the interrupt logic 106 retrieves the interrupt response signals stored in the architecture description memory 101, and generates a corresponding set of transition control signals that define how the current DRPU configuration responds to interrupts in step 1004. The ISS 100 subsequently initializes program state information in step 1006, after which the ISS 100 initiates an instruction execution cycle in step 1008.

Next, in step 1010, the ISS 100 or the interrupt logic 106 determines whether reconfiguration is required. The ISS 100 determines that reconfiguration is required in the event that a reconfiguration directive is selected during program execution. The interrupt logic 106 determines that reconfiguration is required in response to a reconfiguration interrupt. If reconfiguration is required, the preferred method proceeds to step 1012, in which a reconfiguration handler saves program state information. Preferably, the program state information includes a reference to the configuration data set corresponding to the current DRPU configuration. After step 1012, the preferred method returns to step 1000 to retrieve a next configuration data set as referenced by the reconfiguration directive or the reconfiguration interrupt.

In the event that reconfiguration is not required in step 1010, the interrupt logic 106 determines whether a non-reconfiguration interrupt requires servicing in step 1014. If so, the ISS 100 next determines in step 1020 whether a state transition from the current ISS state within the instruction execution cycle to the interrupt service state is allowable based upon the transition control signals. If a state transition to the interrupt service state is not allowed, the ISS 100 advances to a next state in the instruction execution cycle, and returns to state 1020. In the event that the transition control signals allow a state transition from the current ISS state within the instruction execution cycle to the interrupt service state, the ISS 100 next advances to the interrupt service state in step 1024. In step 1024, the ISS 100 saves program state information and executes program instructions for servicing the interrupt. Following step 1024, the preferred method returns to step 1008 to resume the current instruction execution cycle if it had not been completed, or to initiate a next instruction execution cycle.

In the event that no non-reconfiguration interrupt requires servicing in step 1014, the preferred method proceeds to step 1016 and determines whether execution of the current program is complete. If execution of the current program is to continue, the preferred method returns to step 1008 to initiate another instruction execution cycle. Otherwise, the preferred method ends.

The teachings of the present invention are distinctly different from other systems and methods for reprogrammable or reconfigurable computing. In particular, the present invention is not equivalent to a downloadable microcode architecture, because such architectures rely upon a non-reconfigurable control means and non-reconfigurable hardware in general. The present invention is also distinctly different from an Attached Reconfigurable Processor (ARP) system, in which a set of reconfigurable hardware resources are coupled to a nonreconfigurable host processor or host system. An ARP apparatus is dependent upon the host for executing some program instructions. Therefore, the set of available Silicon resources is not maximally utilized over the time frame of program execution because Silicon resources upon the ARP apparatus or the host will be idle or inefficiently used when the host or the ARP apparatus operates upon data, respectively. In contrast, each S-machine 12 is an independent computer in which entire programs can be readily executed. Multiple S-machines 12 preferably execute programs simultaneously. The present invention therefore teaches the maximal utilization of Silicon resources at all times, for both single programs executing upon individual S-machines 12 and multiple programs executing upon the entire system 10.

An ARP apparatus provides a computational accelerator for a particular algorithm at a particular time, and is implemented as a set of gates optimally interconnected with respect to this specific algorithm. The use of reconfigurable hardware resources for general-purpose operations such as managing instruction execution is avoided in ARP systems. Moreover, an ARP system does not treat a given set of interconnected gates as a readily reusable resource. In contrast, the present invention teaches a dynamically reconfigurable processing means configured for efficient management of instruction execution, according to an instruction execution model best-suited to the computational needs at any particular moment. Each S-machine 12 includes a plurality of readily-reusable resources, for example, the ISS 100, the interrupt logic 106, and the store/align logic 152. The present invention teaches the use of reconfigurable logic resources at the level of groups of CLBs, IOBs, and reconfigurable interconnects rather than at the level of interconnected gates. The present invention thus teaches the use of reconfigurable higher-level logic design constructs useful for performing operations upon entire classes of computational problems rather than teaching a single useful gate connection scheme useful for a single algorithm.

In general, ARP systems are directed toward translating a particular algorithm into a set of interconnected gates. Some ARP systems attempt to compile high-level instructions into an optimal gate-level hardware configuration, which is in general an NP-hard problem. In contrast, the present invention teaches the use of a compiler for dynamically reconfigurable computing that compiles high-level program instructions into assembly-language instructions according to a variable ISA in a very straightforward manner.

An ARP apparatus is generally incapable of treating its own host program as data or contextualizing itself. In contrast, each S-machine in the system 10 can treat its own programs as data, and thus readily contextualize itself. The system 10 can readily simulate itself through the execution of its own programs. The present invention additionally has the capability to compile its own compiler.

In the present invention, a single program may include a first group of instructions belonging to a first ISA, a second group of instructions belonging to a second ISA, a third group of instructions belonging to yet another ISA, and so on. The architecture taught herein executes each such group of instructions using hardware that is run-time configured to implement the ISA to which the instructions belong. No prior art systems or methods offer similar teachings.

The present invention further teaches a reconfigurable interruption scheme, in which interrupt latency, interrupt precision, and programmable state transition enabling may change according to the ISA currently under consideration. No analogous teachings are found in other computer systems. The present invention additionally teaches a computer system having a reconfigurable datapath bitwidth, address bitwidth, and reconfigurable control line widths, in contrast to prior art computer systems.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A dynamically reconfigurable processing unit for executing program instructions to process data, the dynamically reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device, and wherein the reconfigure directive is one of the instructions in the first instruction set.

2. A dynamically reconfigurable processing unit for executing program instructions to process data, the dynamically reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device, and wherein the reconfigure directive is a portion of an instruction and the execution of the reconfigure directive is dependent on data stored in registers of the dynamically reconfigurable processing unit.

3. A dynamically reconfigurable processing system comprising:

a dynamically reconfigurable processing unit for executing program instructions to process data, the dynamically reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device; and a second reconfigurable processing unit having an input, an output and a changeable internal hardware organization that is selectively changeable during execution of a sequence of program instructions between the first hardware architecture that executes instructions from the first instruction set and the second hardware architecture that executes instructions of the second instruction set, the input of the second reconfigurable processing unit coupled to the output of the dynamically reconfigurable processing unit, and the output of the second reconfigurable processing unit coupled to the input of the dynamically reconfigurable processing unit.

4. The dynamically reconfigurable processing system of claim 3, wherein the dynamically reconfigurable processing unit is dynamically reconfigurable independent from reconfiguration of the second reconfigurable processing unit.

5. A dynamically reconfigurable processing unit for executing program instructions to process data, the dynamically reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device, and wherein the first ISA comprises a serial instruction processor and the second ISA comprises a parallel instruction processor.

6. A dynamically reconfigurable processing unit for executing program instructions to process data, the dynamically reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device, and wherein the changeable internal hardware organization of the dynamically reconfigurable processing unit comprises a data operate unit having a data port and a control input, for performing operations upon data, the data port of the data operate unit coupled to the data port of the memory and the control input coupled to receive control signals.

7. A dynamically reconfigurable processing unit for executing program instructions to process data, the dynamically reconfigurable processing unit having a input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA, wherein each ISA for the changeable internal hardware organization is capable of being represented as binary data in a memory device, and wherein the changeable internal hardware organization of the reconfigurable processing unit comprises an address operate unit having a control input, an address input, and an output, for performing operations upon addresses, the address input coupled to a data port of a memory, and the output of the address operate unit coupled to an address input of the memory, and the control input of the address operate unit coupled to receive control signals.

8. The dynamically reconfigurable processing unit of claim 7, wherein the address operate unit comprises:
a switch having a data port a control input, a feedback input, and an output, for selectively routing addresses between said data port, said feedback input, and said output in response to control signal receive on said control input, said data port of the switch coupled to the data port of the memory;
a store/count unit having an input, an output, and a control input, for storing data, the input of the store/count unit coupled to the output of the switch, the control input of the store/count logic coupled to receive control signals; and an address operate circuit having an input, an output, and a control input, for performing address computations, the input of the address operate circuit coupled to the output of the store/count unit, the output of the address operate circuit coupled to the feedback input of the switch, and the control input of the address operate unit coupled to receive control signals;
and wherein the address operate circuit is reconfigurable as one selected from the group consisting of a register and a register and an arithmetic unit in response to signals received on the control input of the address operate circuit.

9. A system for dynamically reconfigurable computing, comprising:
a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set, the dynamically reconfigurable processing unit when configured as the first ISA being responsive to a reconfigure directive to change the internal hardware organization of the dynamically reconfigurable processing unit to be configured as the second ISA; and
a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit;
wherein the reconfigure directive is one of the instructions in the first instruction set.

10. The system of claim 9, wherein the first reconfigurable processing unit is constructed of a programmable logic device.

11. A system for dynamically reconfigurable computing, comprising:
a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set;
a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit; and
a master time base unit having an output, for providing a master timing signal to the first reconfigurable processing unit.

12. The system of claim 11, wherein the first reconfigurable processing unit further comprises a local time-base unit having an input and an output, for generating a local timing signal from the master timing signal, the input of the local time-base unit coupled to the output of the master time-base unit, the output of the local time-base unit coupled to a timing input of the reconfigurable processing unit.

13. A system for dynamically reconfigurable computing, comprising:
   a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set; and
   a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit;
   wherein the first reconfigurable processing unit is constructed of a programmable logic device comprising a field programmable gate array including a plurality of configurable logic blocks, a plurality of programmable I/O blocks, a plurality of programmable interconnect structures and data storage resources.

14. A system for dynamically reconfigurable computing, comprising:
   a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set;
   a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit; and
   a memory storing a first configuration data set that corresponds to a first instruction set architecture for a serial instruction processor and a second configuration data set that corresponds to a second instruction set architecture for a parallel instruction processor, and wherein the first reconfigurable processing unit can be selectively configured as one selected from the group consisting of a serial instruction processor and a parallel instruction processor in response to signals from the memory, the first reconfigurable processing unit being coupled to the memory.

15. A system for dynamically reconfigurable computing, comprising:
   a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set; and
   a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit;
   wherein the changeable internal hardware organization of the first reconfigurable processing unit includes a reconfigurable instruction fetch unit having a data input, a first control output, and a second control output, for sequencing instruction execution operations within the first reconfigurable processing unit the data input coupled to a data port of a memory.

16. The system of claim 15, wherein the instruction fetch unit comprises an architecture description memory having an output, the architecture description memory storing a set of architecture description signals including an interrupt response signal that specifies a manner in which the first reconfigurable processing unit responds to an interrupt signal when configured to implement an instruction set architecture.

17. The system of claim 16, wherein the instruction fetch unit comprises:
   an instruction state sequencer having an input and an output for controlling an instruction execution cycle with an instruction fetch state, an instruction decode state, an instruction execution state and a write-back state, the instruction execution cycle resulting in the execution of an instruction within the instruction set architecture;
   an interrupt state machine having an input and an output, for generating a transition control signal that specifies a state within the instruction execution cycle for which a transition to an interrupt service state is allowed, the input of the interrupt state machine coupled to the output of the architecture description memory, the output of the interrupt state machine coupled to the input of the instruction state sequencer;
   a programmable fetch control unit having an input and an output for controlling the operation of an instruction buffer of variable size, the input of the programmable fetch control unit coupled to an output of the instruction state sequencer for receiving signals defining the operation of the programmable fetch control unit, the output of the programmable fetch control unit coupled to the instruction buffer; and
   a programmable decode control unit having an input and an output for controlling the operation of an instruction decoder of variable size, the input of the programmable fetch control unit coupled to the output of the instruction state sequencer for receiving signals defining the operation of the programmable decode control unit, the output of the programmable decode control unit coupled to the instruction decoder, and the instruction decoder coupled to receive program instructions from the instruction buffer.

18. A system for dynamically reconfigurable computing comprising:
   a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set; and a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit;

wherein the changeable internal hardware organization of the first reconfigurable processing unit comprises a reconfigurable data operate unit having a data port and a control input, for performing operations upon data, the data port of the data operate unit coupled to a data port of a memory and the control input coupled to receive control signals.

19. A system for dynamically reconfigurable computing comprising:

a first reconfigurable processing unit for executing program instructions to process data, the first reconfigurable processing unit having an input, an output and a changeable internal hardware organization that is selectively changeable during execution of a sequence of program instructions between a first instruction set architecture (ISA) that executes instructions from a first instruction set and a second instruction set architecture (ISA) that executes instructions of a second instruction set; and a first communication device having an input, and an output, for transferring data to and from the first reconfigurable processing unit, the input of the first communication device coupled to the output of the first reconfigurable processing unit, and the output of the first communication device coupled to the input of the first reconfigurable processing unit;

wherein the changeable internal hardware organization of the first reconfigurable processing unit comprises a reconfigurable address operate unit having a control input, an address input, and an output, for performing operations upon addresses, the address input coupled to a data port of a memory, and the output of the address operate unit coupled to an address input of the memory, and the control input of the address operate unit coupled to receive control signals.

20. On a dynamically reconfigurable computer system having a reconfigurable processing unit, a method for dynamically reconfigurable computing comprising the steps of:

configuring the reconfigurable processing unit for operation according to a first configuration data set that corresponds to a first instruction set architecture (ISA), the configuration of the reconfigurable processing unit resulting in a hardware organization that implements the first ISA, the first configuration data set being capable of being represented as binary data in a memory device;

determining during the execution of a sequence of program instructions whether hardware within the dynamically reconfigurable processing unit is to be reconfigured interrupting an instruction execution cycle of the reconfigurable processing unit; and reconfiguring the reconfigurable processing unit according to a second configuration data set that corresponds to a second instruction set architecture (ISA) such that the hardware organization of the reconfigurable processing unit implements the second ISA, the second configuration data set being capable of being represented as binary data in a memory device.

21. The method of claim 20, further comprising the step of initiating a new instruction execution cycle after the step of reconfiguring.

22. The method of claim 21, wherein the instruction execution cycle corresponds to a first program instruction within the sequence of program instructions, and the new instruction execution cycle corresponds to a second program instruction within the sequence of program instructions.

23. On a dynamically reconfigurable computer system having a reconfigurable processing unit, a method for dynamically reconfigurable computing comprising the steps of:

generating a first set of transition control signals corresponding to a first instruction set architecture (ISA), the first set of transition control signals specifying a set of interruptable states within the instruction execution cycle;

generating a second set of transition control signals corresponding to a second instruction set architecture (ISA), the second set of transition control signals specifying a set of interruptable states within a second instruction execution cycle;

configuring the reconfigurable processing unit for operation according to a first configuration data set that corresponds to the first ISA, the configuration of the reconfigurable processing unit resulting in a hardware organization that implements the first ISA, the first configuration data set being capable of being represented as binary data in a memory device;

interrupting an instruction execution cycle of the reconfigurable processing unit; and reconfiguring the reconfigurable processing unit according to a second configuration data set that corresponds to the second ISA such that the hardware organization of the reconfigurable processing unit implements the second ISA, the second configuration data set being capable of being represented as binary data in a memory device.

24. A dynamically reconfigurable computer comprising:

means for configuring a reconfigurable processing unit according to a first configuration data set that corresponds to a first instruction set architecture (ISA), the configuration of the reconfigurable processing unit resulting in a hardware organization that implements the first instruction set architecture;

means for determining during the execution of a sequence of program instructions whether the reconfigurable processing unit is to be reconfigured; and means for reconfiguring the reconfigurable processing unit according to a second configuration data such that the reconfigurable processing unit has a new hardware organization that implements a second instruction set architecture (ISA);

wherein each ISA is capable of being represented as binary data in a memory device.

25. The computer of claim 21, further comprising:

means for interrupting a first instruction execution cycle corresponding to a first program instruction within the sequence of program instructions in the event that the reconfigurable processing unit is to be reconfigured; and means for initiating a second instruction execution cycle corresponding to a second program instruction within the sequence of program instructions after the reconfigurable processing unit has been reconfigured.

26. The computer of claim 21, further comprising means for generating a set of transition control signals corresponding to an instruction set architecture, the set of transition control signals specifying a set of interruptable states within an instruction execution cycle.

* * * * *